[12] United States Patent
Seeberger et al.

US008921444B2

(10) Patent No.: US 8,921,444 B2
(45) Date of Patent: Dec. 30, 2014

(54) PROCESS FOR THE MODIFICATION OF POLYMERS, IN PARTICULAR POLYMER NANOPARTICLES

(75) Inventors: Peter Seeberger, Kleinmachnow (DE); Hansjoerg Gruetzmacher, Dielsdorf (CH); Klaus Tauer, Stahnsdorf (DE); Judith Braeuer, Mannheim (DE); Paola Laurino, Berlin (DE)

(73) Assignee: Max-Planck-Gesellschaft zur Foerderung der Wissenschaften E.V., Munich (DE)

( * ) Notice: Subject to any disclaimer, the term of this patent is extended or adjusted under 35 U.S.C. 154(b) by 0 days.

(21) Appl. No.: 13/880,055

(22) PCT Filed: Oct. 17, 2011

(86) PCT No.: PCT/EP2011/005205
§ 371 (c)(1),
(2), (4) Date: Jun. 14, 2013

(87) PCT Pub. No.: WO2012/052147
PCT Pub. Date: Apr. 26, 2012

(65) Prior Publication Data
US 2013/0261211 A1 Oct. 3, 2013

(30) Foreign Application Priority Data
Oct. 19, 2010 (EP) .................................. 10013760

(51) Int. Cl.
| *C08F 2/50* | (2006.01) |
| *C08F 2/46* | (2006.01) |
| *B29C 71/04* | (2006.01) |
| *A61L 2/08* | (2006.01) |
| *A61L 24/00* | (2006.01) |
| *C08G 61/04* | (2006.01) |
| *C09D 125/08* | (2006.01) |
| *C08F 8/40* | (2006.01) |
| *C08F 12/08* | (2006.01) |
| *C08F 2/24* | (2006.01) |
| *C08F 2/48* | (2006.01) |
| *B01J 19/12* | (2006.01) |
| *C08F 257/02* | (2006.01) |
| *B82Y 40/00* | (2011.01) |
| *C08F 8/00* | (2006.01) |
| *C09J 125/08* | (2006.01) |

(52) U.S. Cl.
CPC ................ *C08F 8/00* (2013.01); *C09D 125/08* (2013.01); *C08F 8/40* (2013.01); *C08F 12/08* (2013.01); *C08F 2/24* (2013.01); *C08F 2/48* (2013.01); *B01J 19/123* (2013.01); *B01J 19/121* (2013.01); *C08F 257/02* (2013.01); *B82Y 40/00* (2013.01); *C09J 125/08* (2013.01)
USPC .................. 522/64; 522/6; 522/71; 522/189; 522/184; 522/1; 520/1

(58) Field of Classification Search
CPC ............ C08F 2/50; C08F 2/48; C08F 255/02; C08J 3/28
USPC .................... 522/49, 6, 1, 71, 189, 184; 520/1
See application file for complete search history.

(56) References Cited

U.S. PATENT DOCUMENTS

| 7,226,957 | B1 | 6/2007 | Scranton et al. |
| 2003/0042126 | A1 | 3/2003 | Nguyen et al. |
| 2003/0105258 | A1 | 6/2003 | Husemann et al. |
| 2003/0118486 | A1 | 6/2003 | Zhou et al. |
| 2006/0247436 | A1 | 11/2006 | Sommerlade et al. |
| 2008/0004464 | A1 | 1/2008 | Murer et al. |
| 2008/0013537 | A1 | 1/2008 | Dewey et al. |
| 2008/0071115 | A1 | 3/2008 | Sommerlade et al. |
| 2012/0142805 | A1 | 6/2012 | Grutzmacher et al. |

FOREIGN PATENT DOCUMENTS

| EP | 1 300 427 A1 | 4/2003 |
| WO | WO 2005/014605 A1 | 2/2005 |
| WO | WO 2005/042591 A1 | 5/2005 |
| WO | WO 2005/070979 A1 | 8/2005 |
| WO | WO 2006/056541 A1 | 6/2006 |
| WO | WO 2006/074983 A1 | 7/2006 |
| WO | 2008/003601 * | 1/2008 |
| WO | WO 2011/003772 A1 | 1/2011 |

OTHER PUBLICATIONS

Chemtob, Abraham, Benjamin Kuastler, Celine Croutxe-Barghorn, and Samuel Fouchard, Photoinduced miniemulsion polymerization, Feb. 17, 2010, Colloid Polym Sci, 288, 579-587.*
Anonymous, Novel Applications for acylphosphine-oxides, Jun. 1, 1993, Research Disclosure, vol. 350, No. 77, 1-3.*

(Continued)

*Primary Examiner* — Ling Choi
*Assistant Examiner* — Jessica E Whiteley
(74) *Attorney, Agent, or Firm* — Norman B. Thot

(57) ABSTRACT

A process for the preparation of modified polymers by a photo-initiated polymerization includes preparing a polymerization medium comprising at least one photoinitiator comprising at least one phosphorous oxide (P=O) group or at least one phosphorous sulfide (P=S) group, and at least one polymerizable monomer. The at least one polymerizable monomer is polymerized by irradiating the polymerization medium with electromagnetic radiation so as to induce a generation of radicals so as to obtain a polymer. The polymer is modified by irradiating the polymer with electromagnetic radiation so as to induce a generation of radicals from the polymer in a presence of at least one modifying agent.

15 Claims, 5 Drawing Sheets

(56) References Cited

OTHER PUBLICATIONS

Anonymous: "Novel applications for acylphosphine-oxides", Research Disclosure, vol. 350, No. 77, pp. 1-3 (Jun. 1, 1993).

S. Wang et al.: "Preparation of polystyrene particles with narrow particle size distribution by γ-ray initiated miniemulsion polymerization stabilized by polymeric surfactant", European Polymer Journal, vol. 43, pp. 178-184 (2007).

P.-L. Kuo et al.: "Photoinitiated Polymerization of Styrene in Microemulsions", Macromolecules, vol. 20, pp. 1216-1221 (1987).

T. Ott: "Synthesis and Application of Highly Functionalised Acylphosphane Oxides", Dissertation, ETH Zürich No. 18055, Chapter 6 (2008).

A. Chemtob et al.: "Photoinduced miniemulsion polymerization", Colloid Polym Sci, vol. 288, pp. 579-587 (2010).

J. Ugelstad et al.: "Kinetics of Emulsion Polymerization", Journal of Polymer Science, vol. 5, pp. 2281-2288 (1967).

\* cited by examiner

US 8,921,444 B2

PROCESS FOR THE MODIFICATION OF POLYMERS, IN PARTICULAR POLYMER NANOPARTICLES

CROSS REFERENCE TO PRIOR APPLICATIONS

This application is a U.S. National Phase application under 35 U.S.C. §371 of International Application No. PCT/EP2011/005205, filed on Oct. 17, 2011 and which claims benefit to European Patent Application No. 10013760.3, filed on Oct. 19, 2010. The International Application was published in English on Apr. 26, 2012 as WO 2012/052147 A1 under PCT Article 21(2).

FIELD

The present invention relates to a highly efficient process for the photo-initiated preparation of polymers by polymerization using photoinitiators comprising a phosphorous oxide or -sulfide group and modification of said polymers. In particular, the present invention relates to an ultra-fast process for the photo-initiated preparation of lattices comprising polymer nanoparticles by heterophase polymerization using photoinitiators comprising a phosphorous oxide or -sulfide group and their modification. In another aspect, the present invention relates to polymers and polymer nanoparticles obtainable by said process.

BACKGROUND

Polymers, in particular, lattices or polymer particles obtained therefrom are widely used as coatings, adhesives, ink and painting materials, for precision mold constructions and the manufacture of micro-sized materials.

For the latter, the unique properties of micro- and nanoscaled polymer particles with specific properties such as defined molecular weight distributions and polydispersities have meanwhile gained further significant attention not only in the electronics industry, for example, in the manufacture of TFT and LCD displays, digital toners and e-paper, but also in the medical sector such as for drug delivery systems, diagnostic sensors, contrast agents and many other fields of industry.

Polymer nanoparticles are frequently synthesized by physical methods like evaporation of polymer solution droplets or, in particular, for commercially important polymers such as polystyrene and poly(meth)acrylates, by direct synthesis of nanoparticles using special polymerisation processes. The most common processes are heterophase polymerisations, in particular, thermally or photo-initiated emulsion polymerizations.

Over the last decades, efforts were made to develop heterophase polymerization processes and/or post polymerisation modifications in order to achieve better control over molecular weight distribution, particle size of primary polymer nanoparticles, the crosslinking behavior of polymers or polymer nanoparticles or the introduction of polymer end groups.

Emulsion polymerisations induced by X-ray radiation are described in S. Wang, X. Wang, Z. Zhang, Eur. Polym. J., 2007, 43, 178.

Emulsion polymerisations induced by UV/Vis radiation are described in P. Kuo, N. Turro, Macromolecules 1987, 20, 1216-1221, wherein the formation of polystyrene nanoparticles having a weight average molecular weight of 500 kg/mol or less is disclosed.

In T. Ott, Dissertation ETH Zürich No. 18055, 2008, Chapter 6, batch emulsion polymerisations induced by photofragmentation of bisacylphosphines are investigated in detail. However, high monomer conversion typically requires irradiation times of more than 2 hours.

A. Chemtob et al. describes a batch process (in a cuvette) for the preparation of lattices comprising copolymers by irradiating a miniemulsion of nanodroplets comprising acrylic acid, butylacrylate and methylmethacrylate encapsulating high amounts (4 wt.-%) of a hydrophobic photoinitiator of the BAPO type (BAPO=bisacylphosphine oxide).

WO 2005/042591 A describes a process for preparing polymers with defined end group functionalities which comprises polymerizing monomers in a heterophase medium and in the presence of a water-soluble photoinitiator system bearing said desired end group. The end group is deliberated as starter radical for chain propagation upon photofragmentation of the photoinitiator.

A major disadvantage is the use of methylene blue or other colored and/or toxic compounds and the low variability of end groups.

EP 1 300 427 A describes a process for preparing hot melt adhesives which comprises polymerisation of acrylates in the presence of common photoinitiators and control agents such as thioesters, trithiocarbonates or dithioesters in order to provide enhanced crosslinking ability upon UV-irradiation.

A major disadvantage is the use of high amounts of different compounds necessary to achieve the desired properties.

OBJECT

An aspect of the present invention is to provide a process for the efficient and easily controllable post-polymerization modification of polymers, in particular, of lattices or polymer nanoparticles.

In an embodiment, the present invention provides a process for the preparation of modified polymers by a photo-initiated polymerization, the method comprising:

A) preparing a polymerization medium comprising:
   at least one photoinitiator comprising at least one phosphorous oxide group (P=O) or at least one phosphorous sulfide (P=S) group, and
   at least one polymerizable monomer;

B) polymerizing the at least one polymerizable monomer by irradiating the polymerization medium with electromagnetic radiation so as to induce a generation of radicals so as to obtain a polymer; and C) modifying the polymer obtained in step B) by irradiating the polymer with electromagnetic radiation so as to induce a generation of radicals from the polymer in the a presence of at least one modifying agent.

BRIEF DESCRIPTION OF THE DRAWINGS

The present invention is described in greater detail below on the basis of embodiments and of the drawings in which.

DETAILED DESCRIPTION

Figure 1:
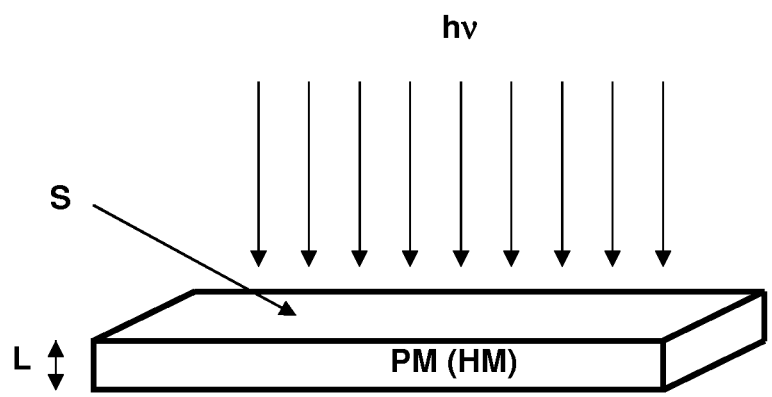
FIG. 1 shows the irradiation of the surface (S) a of a thin film of polymerization medium (PM) having a uniform layer thickness (L)

In an embodiment of the present invention, the process encompasses a process for the preparation of modified polymer nanoparticles formed by photo-initiated heterophase polymerization which comprises at least the steps of:

A) preparing a heterophase medium comprising at least a dispersed phase and a continuous phase and at least
  one or more surfactants
  one or more photoinitiators
  one or more polymerizable monomers
  and B) polymerizing the one or more polymerizable monomers by irradiating said heterophase medium with electromagnetic radiation having a wavelength sufficient to induce the generation of radicals to obtain lattices comprising polymer nanoparticles
  whereby the photoinitiators are selected from compounds comprising at least one phosphorous oxide (P=O) or phosphorous sulfide (P=S) group, and C) modifying the lattices or polymer nanoparticles obtained in step B) by irradiating said lattices or polymer nanoparticles with electromagnetic radiation having a wavelength sufficient to induce the generation of radicals from said lattices or polymer nanoparticles in the presence of at least one modifying agent.

The scope of the present invention encompasses all combinations of substituent definitions, parameters, features and illustrations set forth above and below, either in general or within areas of preference or preferred or alternative embodiments, with one another.

Whenever used herein the terms "including", "for example", "e.g.", "such as" and "like" are meant in the sense of "including but without being limited to" or "for example without limitation", respectively.

The terms "latex" and "lattices" denote suspensions, for example, aqueous suspensions, comprising polymer nanoparticles having an average particle size of 1 to 10,000 nm, for example, 5 to 1,000 nm, for example, 10 to 200 nm and, for example, 10 to 100 nm.

The term "polymer nanoparticles" denotes polymer nanoparticles comprising, for example, at least 10 wt.-%, for example, at least 50 wt.-%, for example, at least 80 wt.-% and, for example, at least 90 wt.-% of a polymer, and, for example, consisting of a polymer.

The average particle size as used herein is defined as being the particle size measured using dynamic light scattering (DLS), which is also known as photon correlation spectroscopy (PSC) or quasi-elastic light scattering (QELS). The particle size measured thereby is also frequently called hydrodynamic diameter and reflects how a particle diffuses within a fluid. The measured hydrodynamic diameter is equivalent to that of an ideal sphere having the same translational diffusion coefficient as the particle being measured. Since the surface structure may have a significant influence, the hydrodynamic diameter measured using DLS can be significantly larger than the true diameter measured e.g. by electron microscopy.

In Dynamic Light Scattering (DLS), the polydispersity index (PDI) reflects the width of the particle size distribution. It ranges from 0 to 1. A value of zero refers to an ideal suspension with no distribution in size. Distributions with PDI values of 0.1 or smaller are called monodisperse while dispersions with values between 0.1 and 0.3 are considered as having a narrow size distribution. Dispersions having a PDI larger than 0.5 are considered as polydisperse.

Particle sizes referred to herein were obtained using a Nicomp particle sizer (PSS Santa Barbara, USA, model 370) at a fixed scattering angle of 90°.

To distinguish the particle size PDI obtained by DLS from the polydispersity index reflecting the molecular mass distribution of a polymer sample ($M_w/M_n$), the former is abbreviated as "DLS-PDI" and the latter as "M-PDI".

The Polymerization Medium

The polymerization according to step B) can be effected in any manner known to those skilled in the art which means for example either as bulk or solution polymerization or as heterophase polymerization in a heterophase medium.

If the polymerization is carried out as bulk or solution polymerization the polymerization medium comprises at least one or more photoinitiators comprising at least one phosphorous oxide (P=O) or phosphorous sulfide (P=S) group and one or more polymerizable monomers as defined and specified in the sections "the photoinitiators" and "the polymerizable polymers" hereinbelow.

In this case the one or more photoinitiators are for example mixed with the one or more polymerizable polymers and polymerized in step B) as described in the section "the polymerization conditions" hereinbelow.

Where solution polymerization is employed the polymerization medium comprises at least one or more photoinitiators comprising at least one phosphorous oxide (P=O) or phosphorous sulfide (P=S) group, one or more polymerizable monomers as defined and specified in the sections "the photoinitiators" and "the polymerizable polymers" hereinbelow and at least one solvent.

In this case the weight ratio of solvent to polymerizable monomer in the polymerization medium is typically of from 1:100 to 100:1, for example, of from 1:5 to 50:1, for example, from 1:1 to 5:1.

As solvents, all compounds capable of dissolving the polymerizable monomers in the intended amounts can be used and which are not radically polymerizable and thus virtually inert under the reaction conditions employed.

Examples of solvents include:
  ethers like for example alkyleneglycolethers such as ethyleneglycoldimethyl- or diethylether, tetrahydrofurane, diethylether, 1,4-dioxane and tert.-butylmethylether;
  aromatic and aliphatic hydrocarbons like petrolethers, pentane, hexane, cyclohexane, heptane, benzene, toluene and xylenes;

halogenated aromatic and aliphatic hydrocarbons like chlorobenzene, dichlor-obenzenes, chloromethane or dichloromethane;

nitriles such as acetonitrile, propanitrile or benzonitrile; and esters and amides such as dimethylformamide, dimethylacetamide, N-methylpyrrolidone, acetic acid methyl- and ethylester.

In an embodiment of the present invention, the type and amount of solvent is chosen so that the polymer formed during polymerization is kept in solution to 80 wt.-% or more, for example, 90 wt.-% or more, and, for example, 95 wt.-% or more.

In an embodiment of the present invention, the type and amount of solvent is chosen so that the polymer formed during polymerization precipitates from the solution in an amount of 50 wt.-% or more, for example, 75 wt.-% or more, and, for example, 90 wt.-% or more.

The weight ratio of photoinitiator to polymerizable monomer in the polymerization medium is typically of from 1:1 to 1:100,000, for example, between 1:5 and 1:100,000, for example, between 1:10 and 1:10,000, and, for example, 1:50 to 1:2,000.

In an embodiment of the present invention, where bulk or solution polymerization are applied the weight ratio of photoinitiator to polymerizable monomer in the polymerization medium is typically of from 5:1 to 1:10,000, for example, from 2:1 to 1:5,000, for example, from 1:1 to 1:1,000, and, for example, from 1:2 to 1:500.

The Heterophase Medium

In an embodiment of the present invention, a heterophase medium is employed in steps A) and B). In step A), a heterophase medium comprising at least a dispersed phase and a continuous phase is then prepared, whereby the heterophase medium further comprises one or more surfactants, one or more polymerizable monomers and one or more photoinitiators comprising at least one phosphorous oxide (P=O) or phosphorous sulfide (P=S) group.

As used herein, the term "heterophase medium comprising at least a dispersed phase and a continuous phase" includes any type of medium comprising at least two phases forming an interface between the continuous phase and the dispersed phase. This includes suspensions and emulsions of any type referred to in the literature such as classical emulsions, microemulsions and miniemulsions. The preparation of emulsions in step A) is preferred.

It is apparent to those skilled in the art, that upon performance of step B), the heterophase medium may undergo a transition, for example, from an emulsion to a suspension.

The heterophase medium prepared in step A) may either comprise one or more solid phases or not.

In an embodiment of the present invention, the heterophase medium comprises solid materials within the ranges given above which are intended to be encapsulated by the polymers formed during polymerization.

Such solid materials may comprise inorganic compounds or organic compounds which are either not or not completely soluble in the heterophase medium.

In an embodiment of the present invention, the heterophase medium prepared in step A1) comprises a solids content of from more than 0 to 50 wt.-%, for example, from more than 0 to 25 wt.-%, for example, from more than 0 wt.-% to 10 wt.-%, and, for example, from more than 0 wt.-% to 2 wt.-%.

In an embodiment of the present invention, the heterophase medium comprises at least two liquid organic phases or a liquid aqueous phase and a liquid organic phase, whereby in an embodiment, the liquid aqueous phase represents the continuous phase and the liquid organic phase represents the dispersed phase.

In an embodiment of the present invention, an aqueous phase, for example, an aqueous continuous phase, comprises water and either at least one water miscible organic solvent or not.

As used herein, the term water miscible organic solvent denotes organic solvents which are miscible with water in any ratio.

Suitable water miscible organic solvents include aliphatic alcohols, glycols, ethers, glycol ethers, pyrrolidines, N-alkylpyrrolidinones, N-alkyl pyrrolidones, polyethylene glycols, polypropylene glycols, amides, carboxylic acids, esters, sulfoxides, sulfones, hydroxyether derivatives such as butyl carbitol or cellosolve, amino alcohols, ethers such as tetrahydrofurane and dioxane, ketones, and the like, as well as derivatives thereof and mixtures thereof, provided, however, that they are miscible with water in any ratio.

Specific examples include methanol, ethanol, propanol, tetrahydrofurane, dioxane, ethylene glycol, propylene glycol, diethylene glycol, glycerol, dipropylene glycol or mixtures thereof.

The addition of water miscible organic solvents might be useful in those cases where low polymerization temperatures shall be employed or where the partition of the photoinitiator between the phases or the monomer solubility in the phases shall be adjusted.

In addition thereto, the solubility of hydrophobic polymerizable monomers within the aqueous continuous phase is typically raised so that the reaction rate, the particle size and the average molecular weight can be influenced by the added amount of water miscible organic solvent.

The addition of water miscible organic solvents furthermore allows the reaction temperature to be lowered significantly below the freezing point of water or an aqueous phase.

In an embodiment of the present invention, the aqueous phase, for example, the aqueous continuous phase, comprises either 0 wt.-%, or from more than 0 to 20 wt-% of water-miscible organic solvents.

If water miscible solvents are employed, their content in an aqueous phase, in particular an aqueous continuous phase can, for example, be more than 0 to 10 wt-%, for example, more than 0 to 5 wt-% and, for example, more than 0 to 2 wt.-%.

In an embodiment of the present invention, the solubility of hydrophilic polymerizable monomers within the aqueous continuous phase can optionally be lowered by dissolving salts such as inorganic salts like sodium chloride and the like. The content of salts may in this case amount to for example more than 0 to 5 wt.-%, for example, from 0.1 to 3 wt.-%.

If water is applied as a dispersed or as a continuous phase, the pH value of the aqueous phase is typically in the range of 3 to 10, for example, in the range of 5 to 9 measured or calculated on standard conditions.

The preparation of the heterophase medium is typically effected by simply mixing the components by standard mixing elements such as agitators, static mixers or combinations thereof such as rotor-stator mixers. Even though not typically necessary, the mixing can be supported by using high force dispersion devices such as, for example, ultrasound sonotrodes or high pressure homogenizers.

In an embodiment of the present invention, the mixing results in a number average droplet size of below 100 μm, for example, between 5 and 50 μm, as measured by light microscopy imaging.

The preparation of the heterophase medium in step A) may either be performed batchwise or continuously.

The heterophase medium comprises one or more surfactants. Suitable surfactants are, for example, non-ionic, cat-ionic or anionic or amphoteric surfactants.

Anionic surfactants include $C_6$-$C_{24}$-alkyl sulfonates which are either not or once substituted by $C_6$ to $C_{14}$ aryl, $C_6$-$C_{24}$-fluoroalkyl sulfonates, $C_6$-$C_{18}$-alkyl ether sulfonates, $C_6$-$C_{14}$-aryl sulfonates, $C_1$-$C_{24}$-alkyl succinates, $C_1$-$C_{24}$-alkyl sulfo succinates, N—($C_1$-$C_{24}$-alkyl)-sarkosinates, acyl-taurates, $C_6$-$C_{24}$-perfluoroalkyl carboxylates, $C_6$-$C_{24}$-alkyl phosphates, $C_6$-$C_{24}$-alkyl ether phosphates, $C_6$-$C_{24}$-alkyl ether carboxylates, in particular, the alkali metal, ammonium-, and organic ammonium salts of the aforementioned compounds.

Cationic surfactants include quarternary ammonium salts or pyridinium salts.

Non-ionic surfactants include polymeric surfactants of the block and graft copolymer type such as triblock copolymers commercially available and commonly known as pluronics (BASF SE) and synperonics (ICI) comprising two blocks of poly(ethylene)oxide and one intermediate poly(propyleneoxide) block or "inverse pluronics" and "inverse synperonics" comprising two blocks of poly(propyleneoxide) and one intermediate poly(ethylene)oxide block. Non-ionic surfactants further include homopolymers of ethyleneoxide and propyleneoxide and ethoxylated and/or propoxylated sugars, phenols or hydroxyl fatty acids. Non-ionic surfactants further include statistical polymers such as those described in WO 2005/070979 A.

In an embodiment of the present invention, at least one surfactant is selected from the group consisting of sodium lauryl sulfonate, ammonium lauryl sulfonate, sodium lauryl ether sulfonate, ammonium lauryl ether sulfonate, sodium lauryl sarkosinate, sodium oleyl succinate, sodium dodecylbenzene sulfonate (SDS), triethanolamine dodecyl benzene sulphate, cetyltrimethylammonium bromide, cetylpyridinium chloride, polyethoxylated tallow amine, benzalkonium chloride and benzethonium chloride.

In an embodiment of the present invention, one or more photoinitiators may themselves serve as a surfactant if comprising $C_6$-$C_{24}$-alkyl which are either not or once substituted by $C_6$ to $C_{14}$ aryl, $C_6$-$C_{24}$-fluoroalkyl or $C_6$-$C_{24}$-alkyl ether substituents.

The weight ratio of surfactant and the continuous phase is typically between 1:10,000 and 1:5, for example, between 1:100 and 1:20, whereby the amount should be at least equal or higher than the critical micelle concentration (CMC) in the heterophase medium. The CMC is defined as being the lowest concentration of surfactant at which micelle formation is observed and which is dependent on the nature of the surfactant used and the heterophase medium employed.

In an embodiment of the present invention, the amount of surfactant employed is at least four times, for example, at least eight times and, for example, at least twelve times higher than the CMC.

The weight ratio of the continuous phase and the dispersed phase depends on the surface energy and the phase inversion point but is typically between 1:2 and 500:1, for example, between 1.5:1 and 20:1.

The Photoinitiators

The polymerization medium, in particular, the heterophase medium further comprises one or more photoinitiators comprising at least one phosphorous oxide (P═O) or phosphorous sulfide (P═S) group.

Examples of photoinitiators are those of formula (I):

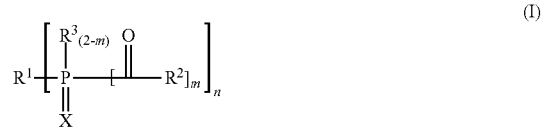

wherein n is 1 or 2 or a higher integer, m is 0, 1 or 2,

X is sulphur or oxygen, $R^1$, if n=1 is $C_6$-$C_{14}$-aryl or $C_3$-$C_{14}$-heterocyclyl, or is $C_1$-$C_{18}$-alkoxy, —N($R^4$)$_2$, $C_1$-$C_{18}$-alkyl, $C_2$-$C_{18}$-alkenyl or $C_2$-$C_{18}$-alkinyl, which is either not, once, twice or more than twice interrupted by non-successive functional groups selected from the group consisting of:

—O—, —S—, —SO$_2$—, —SO—, —SO$_2$NR$^4$—, NR$^4$SO$_2$—, —NR$^4$—, —N$^+$(R$^4$)$_2$An$^-$-, —CO—, —O(CO)—, (CO)O—, —O(CO)O—, —NR$^4$(CO)NR$^4$—, NR$^4$(CO)—, —(CO)NR$^4$—, —NR$^4$(CO)O—, —O(CO)NR$^4$—, —Si(R$^5$)$_2$—, —OSi(R$^5$)$_2$—, —OSi(R$^5$)$_2$O—, —Si(R$^5$)$_2$O—, and which is either not, once, twice or more than twice interrupted by bivalent residues selected from the group consisting of $C_3$-$C_{14}$-heterocyclo-diyl, $C_3$-$C_{14}$-heterocyclo-diylium$^+$An$^-$ and $C_6$-$C_{14}$-aryldiyl, and which is not, additionally or alternatively, either once, twice or more than twice substituted by substituents selected from the group consisting of:

halogen, cyano, azido, vicinal oxo (forming epoxides), vicinal NR$^5$ (forming aziridins), $C_6$-$C_{14}$-aryl, $C_1$-$C_8$-alkoxy, $C_1$-$C_8$-alkylthio, hydroxy, —SO$_3$M, —COOM, PO$_3$M$_2$, —PO(N(R$^5$)$_2$)$_2$, PO(OR$^5$)$_2$, —SO$_2$N(R$^4$)$_2$, —N(R$^4$)$_2$, —N$^+$(R$^4$)$_3$An$^-$, $C_3$-$C_{14}$-heterocyclylium$^+$An$^-$, —CO$_2$N(R$^4$)$_2$, —COR$^4$, —OCOR$^4$, —NR$^4$(CO)R$^5$, —(CO)OR$^4$, —NR$^4$(CO)N(R$^4$)$_2$, NR$^4$SO$_2$R$^4$, —Si(OR$^5$)$_y$(R$^5$)$_{(3-y)}$, —OSi(OR$^5$)$_y$(R$^5$)$_{(3-y)}$ with y=1, 2 or 3, $R^1$, if n=2 is $C_6$-$C_{15}$-aryldiyl or $C_3$-$C_{14}$-heterocyclo-diyl is $C_1$-$C_{18}$-alkanediyl, $C_2$-$C_{18}$-alkenediyl or $C_2$-$C_{18}$-alkinediyl, which is either not, once, twice or more than twice interrupted by non-successive groups selected from the group consisting of:

—O—, —S—, —SO$_2$—, —SO—, —SO$_2$NR$^4$—, NR$^4$SO$_2$—, —NR$^4$—, —N$^+$(R$^4$)$_2$An$^-$-, —CO—, —O(CO)—, (CO)O—, —O(CO)O—, —NR$^4$(CO)NR$^4$—, NR$^4$(CO)—, —(CO)NR$^4$—, —NR$^4$(CO)O—, —O(CO)NR$^4$—, —Si(R$^5$)$_2$—, —OSi(R$^5$)$_2$—, —OSi(R$^5$)$_2$O—, —Si(R$^5$)$_2$O—, and which is either not, once, twice or more than twice interrupted by bivalent residues selected from the group consisting of $C_3$-$C_{14}$-heterocyclo-diyl, $C_3$-$C_{14}$-heterocyclo-diylium$^+$An$^-$ and $C_6$-$C_{14}$-aryldiyl, and which is not, additionally or alternatively either once, twice or more than twice substituted by substituents selected from the group consisting of:

halogen, cyano, azido, vicinal oxo (forming epoxides), vicinal NR$^5$ (forming aziridins), $C_6$-$C_{14}$-aryl, $C_1$-$C_8$-alkoxy, $C_1$-$C_8$-alkylthio, hydroxy, —SO$_3$M, —COOM, PO$_3$M$_2$, —PO(N(R$^5$)$_2$)$_2$, PO(OR$^5$)$_2$, —SO$_2$N(R$^4$)$_2$, —N(R$^4$)$_2$, —N$^+$(R$^4$)$_3$An$^-$, $C_3$-$C_{14}$-heterocyclylium$^+$An$^-$, —CO$_2$N(R$^4$)$_2$, —COR$^4$, —OCOR$^4$, —NR$^4$(CO)R$^5$, —(CO)OR$^4$, —NR$^4$(CO)N(R$^4$)$_2$, NR$^4$SO$_2$R$^4$, —Si(OR$^5$)$_y$(R$^5$)$_{(3-y)}$, —OSi(OR$^5$)$_y$(R$^5$)$_{(3-y)}$ with y=1, 2 or 3, or is bivalent bis(C$_6$-C$_{15}$)-aryl, which is either not or once interrupted by groups selected from the group consisting of:

—O—, —S—, —SO$_2$—, —SO—, C$_4$-C$_{18}$-alkanediyl, C$_2$-C$_{18}$-alkenediyl,

R$^1$, if n is an integer larger than 2
  is a polymeric backbone having n binding sites to residues of formula (I) given in brackets labelled with n R$^2$, is C$_6$-C$_{14}$-aryl or C$_3$-C$_{14}$-heterocyclyl or
  is C$_1$-C$_{18}$-alkyl, C$_2$-C$_{18}$-alkenyl or C$_2$-C$_{18}$-alkinyl,
  which is either not, once, twice or more than twice interrupted by non-successive functional groups selected from the group consisting of:
    —O—, —NR$^4$—, —N$^+$(R$^4$)$_2$An$^-$-, —CO—, —OCO—, —O(CO)O—, NR$^4$(CO)—, —NR$^4$(CO)O—, O(CO)NR$^4$—, —NR$^4$(CO)NR$^4$—,
  and which is either not, once, twice or more than twice interrupted by bivalent residues selected from the group consisting of heterocyclo-diyl, heterocyclo-diylium$^+$An$^-$, and C$_6$-C$_{14}$-aryldiyl,
  and which is not, additionally or alternatively either once, twice or more than twice substituted by substituents selected from the group consisting of:
    halogen, cyano, hydroxy, protected hydroxyl, C$_6$-C$_{14}$-aryl; C$_3$-C$_{14}$-heterocyclyl, C$_1$-C$_8$-alkoxy, C$_1$-C$_8$-alkylthio, C$_2$-C$_8$-alkenyl, —COOM, —SO$_3$M, —PO$_3$M$_2$, —SO$_2$N(R$^4$)$_2$, —NR$^4$SO$_2$R$^5$, —N(R$^4$)$_2$—, —N$^+$(R$^4$)$_3$An$^-$, —CO$_2$N(R$^4$)$_2$, —COR$^4$—, —OCOR$^5$, —O(CO)OR$^5$, NR$^4$(CO)R$^4$, —NR$^4$(CO)OR$^4$, O(CO)N(R$^4$)$_2$, —NR$^4$(CO)N(R$^4$)$_2$,
  whereby in case of m=2 the two substituents R$^2$ are different or identical, or jointly are C$_6$-C$_{15}$-aryldiyl, C$_3$-C$_{14}$-heterocyclo-diyl, C$_1$-C$_{18}$-alkanediyl, C$_2$-C$_{18}$-alkenediyl or C$_2$-C$_{18}$-alkinediyl, R$^3$ independently denotes a substituent as defined for R$^1$ if n is 1, whereby R$^4$ is independently selected from the group consisting of hydrogen, C$_1$-C$_8$-alkyl, C$_6$-C$_{14}$-aryl and C$_3$-C$_{14}$-heterocyclyl or N(R$^4$)$_2$ as a whole is a N-containing C$_3$-C$_{14}$-heterocycle, or N$^+$(R$^4$)$_2$An$^-$ and N$^+$(R$^4$)$_3$An$^-$ as a whole are or contain a N-containing C$_3$-C$_{14}$-heterocyclyl substituent with a counteranion, R$^5$ is independently selected from the group consisting of C$_1$-C$_8$-alkyl, C$_6$-C$_{14}$-aryl and C$_3$-C$_{14}$-heterocyclyl or N(R$^5$)$_2$ as a whole is a N-containing C$_3$-C$_{14}$-heterocycle, or N$^+$(R$^5$)$_2$An$^-$ and N$^+$(R$^5$)$_3$An$^-$ as a whole are or contain a N-containing C$_3$-C$_{14}$-heterocyclyl substituent with a counteranion, M is hydrogen, or 1/q equivalent of an q-valent metal ion or is a C$_3$-C$_{14}$-heterocyclylium cation, an ammonium ion or a primary, secondary, tertiary or quarternary organic ammonium ion or a guanidinium ion or an organic guanidinium ion, An$^-$ is 1/p equivalent of a p-valent anion.

The compounds of formula (I) are known and can be prepared according to or in analogy to methods known to those skilled in the art.

For compounds wherein m is 1 or 2 preparation procedures are described in WO 2005/014605, WO 2006/056541, WO 2006/074983 and in T. Ott, Dissertation ETH Zürich No. 18055, 2008, whereby the latter in particular discloses compounds wherein R$^1$ is a polymeric backbone. These compounds are incorporated herein by reference.

In an embodiment of the present invention, one or more photoinitiators of formula (I) are used, whereby in formula (I) X denotes oxygen.

In an embodiment of the present invention, one or more photoinitiators of formula (I) are used, whereby in formula (I) X denotes oxygen and n is 1 or 2.

In an embodiment of the present invention, one or more photoinitiators of formula (I) are used, whereby in formula (I) X denotes oxygen and n is 1 or 2 and m is 1 or 2.

In an embodiment of the present invention, one or more photoinitiators of formula (I) are used, whereby in formula (I):

X is oxygen
n is 1,
m is 0, 1 or 2,
R$^1$ is C$_6$-C$_{14}$-aryl or C$_3$-C$_{14}$-heterocyclyl, or
  is C$_1$-C$_{18}$-alkyl or C$_2$-C$_{18}$-alkenyl,
  which is either not or once, twice or more than twice interrupted by non-successive functional groups selected from the group consisting of:
    —O—, —NR$^4$—, —N$^+$(R$^4$)$_2$An$^-$-, —CO—, —OCO—, NR$^4$(CO)—, —(CO)NR$^4$—,
  and which is not, additionally or alternatively, for example, alternatively either not, once, twice or more than twice, for example, not or once, for example, once substituted by substituents selected from the group consisting of:
    halogen, cyano, vicinal oxo (forming epoxides), vicinal NR$^5$ (forming aziridins), C$_6$-C$_{14}$-aryl; C$_1$-C$_8$-alkoxy, C$_2$-C$_8$-alkenyl, hydroxy, —SO$_3$M, —COOM, PO$_3$M$_2$, —PO(N(R$^5$)$_2$)$_2$, —SO$_2$N(R$^4$)$_2$, —N(R$^4$)$_2$, —N$^+$(R$^4$)$_3$An$^-$, C$_3$-C$_{14}$-heterocyclo-diylium$^+$An$^-$, —CO$_2$N(R$^4$)$_2$, —COR$^4$, —OCOR$^4$, NR$^4$(CO)R$^5$, R$^2$ is C$_6$-C$_{14}$-aryl or C$_3$-C$_{14}$-heterocyclyl, or
  is C$_1$-C$_{18}$-alkyl or C$_2$-C$_{18}$-alkenyl
  which is either not, once, twice or more than twice interrupted by non-successive functional groups selected from the group consisting of:
    —O—, —NR$^4$—, —N$^+$(R$^4$)$_2$An$^-$-, —CO—, NR$^4$(CO)—, —NR$^4$(CO)O—, (CO)NR$^4$—,
  and which is not, additionally or alternatively either once, twice or more than twice substituted by substituents selected from the group consisting of:
    halogen, cyano, hydroxyl, C$_6$-C$_{14}$-aryl; C$_3$-C$_{14}$-heterocyclyl, C$_1$-C$_8$-alkylthio, C$_2$-C$_8$-alkenyl, —COOM, SO$_2$N(R$^4$)$_2$—, N(R$^4$)$_2$—, —N$^+$(R$^4$)$_3$An$^-$, —CO$_2$N(R$^4$)$_2$,
  whereby in case of m=2 the two substituents R$^2$ are different or identical, or jointly are C$_6$-C$_{15}$-aryldiyl or C$_1$-C$_{18}$-alkanediyl R$^3$ independently denotes a substituent as defined for R$^1$ directly above, whereby, R$^4$ is independently selected from the group consisting of halogen, C$_1$-C$_8$-alkyl, C$_6$-C$_{14}$-aryl and C$_3$-C$_{14}$-heterocyclyl or N(R$^4$)$_2$ as a whole is a N-containing C$_3$-C$_{14}$-heterocycle, or N$^+$(R$^4$)$_2$An$^-$ and N$^+$(R$^4$)$_3$An$^-$ as a whole are or contain a N-containing C$_3$-C$_{14}$-heterocyclyl substituent with a counteranion, R$^5$ is independently selected from the group consisting C$_1$-C$_8$-alkyl, C$_6$-C$_{14}$-aryl and C$_3$-C$_{14}$-heterocyclyl or N(R$^5$)$_2$ as a whole is a N-containing C$_3$-C$_{14}$-heterocycle, or N$^+$(R$^5$)$_2$An$^-$ and N$^+$(R$^5$)$_3$An$^-$ as a whole are or contain a N-containing C$_3$-C$_{14}$-heterocyclyl substituent with a counteranion, M is hydrogen, or 1/q equivalent of an q-valent metal ion or is a C$_3$-C$_{14}$-heterocyclylium cation, an ammonium ion or a primary, secondary, tertiary or quarternary organic ammonium ion or a guanidinium ion or an organic guanidinium ion, for example, hydrogen, lithium, sodium, potassium, one half equivalent of calcium, zinc or iron (II), or one third equivalent of aluminium (III) or a $C_3$-$C_{14}$-heterocyclylium cation or an ammonium ion or a primary, secondary, tertiary or quarternary organic ammonium ion, and $An^-$ is 1/p equivalent of a p-valent anion.

In an embodiment of the present invention, one or more photoinitiators of formula (I) are used, where in formula (I):

X is oxygen
n is 1,
m is 1 or 2
$R^1$ and $R^3$ are independently of each other,
$C_6$-$C_{14}$-aryl or $C_3$-$C_{14}$-heterocyclyl, or
are $C_1$-$C_{18}$-alkyl or $C_2$-$C_{18}$-alkenyl,
which is either not or once, twice or more than twice interrupted by non-successive functional groups selected from the group consisting of:
—O—, —$NR^4$—, —$NR^4$(CO)—, —(CO)$NR^4$—,
and which is not, additionally or alternatively, for example, alternatively either not, once, twice or more than twice, for example, not or once, for example, once substituted by substituents selected from the group consisting of:
chloro, fluoro, cyano, hydroxy, $C_6$-$C_{14}$-aryl; $C_1$-$C_8$-alkoxy, —$SO_3M$, —COOM, $PO_3M_2$, —PO(N($R^5$)$_2$)$_2$, —$SO_2N(R^4)_2$, —$N(R^4)_2$, —$N^+(R^4)_3An^-$, $C_3$-$C_{14}$-heterocyclo-diylium$^+An^-$, —$CO_2N(R^4)_2$, —$COR^4$, —(CO)$OR^4$, —$OCOR^4$, $NR^4(CO)R^5$, $R^2$ is $C_6$-$C_{14}$-aryl, whereby in case of m=2 the two substituents $R^2$ are different or identical, for example, identical or jointly are $C_6$-$C_{15}$-aryldiyl or $C_1$-$C_{18}$-alkanediyl, whereby $R^2$ is, for example, $C_6$-$C_{14}$-aryl.

whereby, $R^4$ is independently selected from the group consisting of hydrogen, $C_1$-$C_8$-alkyl, $C_6$-$C_{14}$-aryl and $C_3$-$C_{14}$-heterocyclyl or $N(R^4)_2$ as a whole is a N-containing $C_3$-$C_{14}$-heterocycle, or $N^+(R^4)_2An^-$ and $N^+(R^4)_3An^-$ as a whole are or contain a N-containing $C_3$-$C_{14}$-heterocyclyl substituent with a counteranion, $R^5$ is independently selected from the group consisting of $C_1$-$C_8$-alkyl, $C_6$-$C_{14}$-aryl and $C_3$-$C_{14}$-heterocyclyl or $N(R^5)_2$ as a whole is a N-containing $C_3$-$C_{14}$-heterocycle, or $N^+(R^5)_2An^-$ and $N^+(R^5)_3An^-$ as a whole are or contain a N-containing $C_3$-$C_{14}$-heterocyclyl substituent with a counteranion, M is hydrogen, or 1/q equivalent of an q-valent metal ion or is a $C_3$-$C_{14}$-heterocyclylium cation, an ammonium ion or a primary, secondary, tertiary or quarternary organic ammonium ion or a guanidinium ion or an organic guanidinium ion, for example, hydrogen, lithium, sodium, potassium, one half equivalent of calcium, zinc or iron (II), or one third equivalent of aluminum (III) or a $C_3$-$C_{14}$-heterocyclylium cation or an ammonium ion or a primary, secondary, tertiary or quarternary organic ammonium ion, for example, hydrogen, lithium, sodium and potassium, and $An^-$ is 1/p equivalent of a p-valent anion, for example, chloride, a carboxylate, $C_1$-$C_8$-alkylsulfate, $C_6$-$C_{14}$-arylsulfate, hexafluorophosphate, tetrafluoroborate, dihydrogenphosphate, one half equivalent of sulphate or hydrogenphosphate.

In an embodiment of the present invention, one or more photoinitiators of formula (I) are used, where in formula (I):

X is oxygen
n is 1,
m is 1 or 2,
$R^1$ and $R^3$ are independently of each other $C_6$-$C_{14}$-aryl, or are $C_1$-$C_{18}$-alkyl,
which is either not or once, twice or more than twice interrupted by non-successive functional groups selected from the group consisting of:
—O— or —$NR^4$—,
and which is not, additionally or alternatively, for example, alternatively either not, once, twice or more than twice, for example, not or once, for example, once substituted by substituents selected from the group consisting of:
chloro, fluoro, $C_1$-$C_8$-alkoxy, hydroxy, —$SO_3M$, —COOM, $PO_3M_2$, $SO_2N(R^4)_2$, —$N(R^4)_2$, —$N^+(R^4)_3An^-$, —$CO_2N(R^4)_2$, $R^2$ is $C_6$-$C_{14}$-aryl,
whereby in case of m=2 the two substituents $R^2$ are different or identical, for example, identical or jointly are $C_6$-$C_{15}$-aryldiyl or $C_1$-$C_{18}$-alkanediyl, whereby, for example, $R^2$ is $C_6$-$C_{14}$-aryl.

whereby, $R^4$ is independently selected from the group consisting of $C_1$-$C_8$-alkyl, $C_6$-$C_{14}$-aryl and $C_3$-$C_{14}$-heterocyclyl or $N(R^4)_2$ as a whole is a N-containing $C_3$-$C_{14}$-heterocycle, or $N^+(R^4)_2An^-$ and $N^+(R^4)_3An^-$ as a whole are or contain a N-containing $C_3$-$C_{14}$-heterocyclyl substituent with a counteranion, M is hydrogen, or 1/q equivalent of an q-valent metal ion or is a $C_3$-$C_{14}$-heterocyclylium cation, an ammonium ion or a primary, secondary, tertiary or quarternary organic ammonium ion or a guanidinium ion or an organic guanidinium ion, for example, hydrogen, lithium, sodium, potassium, one half equivalent of calcium, zinc or iron (II), or one third equivalent of aluminium (III) or a $C_3$-$C_{14}$-heterocyclylium cation or an ammonium ion or a primary, secondary, tertiary or quarternary organic ammonium ion, for example, lithium, sodium and potassium, and fore example, hydrogen, lithium, sodium and potassium.

$An^-$ is 1/p equivalent of a p-valent anion, for example, chloride, a $C_1$-$C_8$-alkyl carboxylate, $C_1$-$C_8$-alkylsulfate, $C_6$-$C_{14}$-arylsulfate, hexafluorophosphate, tetrafluoroborate, dihydrogenphosphate, one half equivalent of sulphate or hydrogenphosphate.

In an embodiment of the present invention, one or more photoinitiators of formula (I) are used, where in formula (I):

X is oxygen
n is 1,
m is 1 or 2,
$R^1$ and $R^3$ are different or identical and are $C_6$-$C_{14}$-aryl, or are $C_1$-$C_{18}$-alkyl,
which is either not or once, twice or more than twice interrupted by non-successive functional groups selected from the group consisting of:
—O—, —$NR^4$—, for example, in case of —O— to form polyethyleneglycolether groups [—$CH_2CH_2$—O]$_x$—H, [—$CH_2CH_2$—O]$_{(x-1)}$—$CH_3$ or [—$CH_2CH_2$—O]$_{(x-1)}$—$CH_2CH_3$ with x being an integer from 1 to 8,
and which additionally or alternatively are either not, once, twice or more than twice, for example, not or once, for example, once substituted by substituents selected from the group consisting of: chloro, fluoro, hydroxy, —$SO_3M$, —COOM, —$CON(R^4)_2$, —N($R^4$)$_2$, —N$^+$($R^4$)$_3$An$^-$, heterocyclylium$^+$An$^-$, for example, —COOM, for example, once by COOM, and $R^2$ is $C_6$-$C_{14}$-aryl, for example, 2,4,6-trimethylphenyl (mesityl) or 2,6-dimethoxyphenyl, whereby in case of m=2 the substituents $R^2$ are different or identical, for example, identical, for example, identically are 2,4,6-trimethylphenyl or 2,6-dimethoxyphenyl, for example, 2,4,6-trimethylphenyl, whereby, $R^4$ is independently selected from the group consisting of hydrogen, $C_1$-$C_8$-alkyl, $C_6$-$C_{14}$-aryl and $C_3$-$C_{14}$-heterocyclyl or N($R^4$)$_2$ as a whole is a N-containing $C_3$-$C_{14}$-heterocycle, or N$^+$($R^4$)$_2$An$^-$ and N$^+$($R^4$)$_3$An$^-$ as a whole are or contain a N-containing $C_3$-$C_{14}$-heterocyclyl substituent with a counteranion, M is hydrogen, or 1/q equivalent of an q-valent metal ion or is a $C_3$-$C_{14}$-heterocyclylium cation, an ammonium ion or a primary, secondary, tertiary or quarternary organic ammonium ion or a guanidinium ion or an organic guanidinium ion, for example, hydrogen, lithium, sodium, potassium, one half equivalent of calcium, zinc or iron (II), or one third equivalent of aluminium (III) or a $C_3$-$C_{14}$-heterocyclylium cation or an ammonium ion or a primary, secondary, tertiary or quarternary organic ammonium ion, for example, hydrogen, lithium, sodium and potassium, and An$^-$ is 1/p equivalent of a p-valent anion, for example, chloride, a $C_1$-$C_8$-alkyl carboxylate, $C_1$-$C_8$-alkylsulfate, $C_6$-$C_{14}$-arylsulfate, hexafluorophosphate, tetrafluoroborate, dihydrogenphosphate, one half equivalent of sulphate or hydrogenphosphate.

Examples of photoinitiators of formula (I) are:

2-(bis(2,4,6-trimethylbenzoyl)phosphoryl)acetic acid (hereinafter also referred to as BAPO-AA) and its salts, in particular its sodium and potassium salts, (2-(2-(2-methoxyethoxy)ethyl)-bis(2,4,6-trimethylbenzoyl)-phosphineoxide, 2,4,6-trimethylbenzoyl-diphenylphosphineoxide (hereinafter also referred to as MAPO, which is commercially available as Lucirin TPO from BASF SE) and bis(2,4,6-trimethylbenzoyl)-phenylphosphineoxide (which is commercially available as Irgacure® 819 from BASF SE).

In an embodiment for the process according to the present invention, water-soluble photoinitiators of formula (I) are employed if a polymerization medium, in particular, a heterophase medium, comprising an aqueous phase is used. As used herein "water-soluble" means a solubility of a photoinitiator in water at 25° C. of at least 0.5 g per 1,000 g of water.

As used herein, and unless specifically stated otherwise, $C_6$-$C_{14}$-aryl denotes carbocyclic aromatic substituents having six to fourteen carbon atoms within the aromatic system as such, i.e., without carbon atoms of substituents, for example, phenyl ($C_6$), naphthyl ($C_{10}$), phenanthrenyl and anthracenyl (each $C_{14}$), whereby said carbocyclic, aromatic substituents are unsubstituted or substituted by up to five identical or different substituents per cycle. The substituents can, for example, be selected from the group consisting of fluoro, bromo, chloro, iodo, nitro, cyano, formyl or protected formyl, hydroxyl or protected hydroxyl, $C_1$-$C_8$-alkyl, $C_1$-$C_8$-haloalkyl, $C_1$-$C_8$-alkoxy, $C_1$-$C_8$-haloalkoxy, $C_6$-$C_{14}$-aryl, in particular phenyl and naphthyl, di($C_1$-$C_8$-alkyl)amino, ($C_1$-$C_8$-alkyl)amino, CO($C_1$-$C_8$-alkyl), OCO($C_1$-$C_8$-alkyl), NHCO($C_1$-$C_8$-alkyl), N($C_1$-$C_8$-alkyl)CO($C_1$-$C_8$-alkyl), CO($C_6$-$C_{14}$-aryl), OCO($C_6$-$C_{14}$-aryl), NHCO($C_6$-$C_{14}$-aryl), N($C_1$-$C_8$-alkyl)CO($C_6$-$C_{14}$-aryl), COO—($C_1$-$C_8$-alkyl), COO—($C_6$-$C_{14}$-aryl), CON($C_1$-$C_8$-alkyl)$_2$ or CONH($C_1$-$C_8$-alkyl), $CO_2$M, $CONH_2$, $SO_2NH_2$, $SO_2$N($C_1$-$C_8$-alkyl)$_2$, $SO_3$M and $PO_3M_2$.

In an embodiment of the present invention, the carbocyclic, aromatic substituents are unsubstituted or substituted by up to three identical or different substituents per cycle selected from the group consisting of fluoro, chloro, cyano, $C_1$-$C_8$-alkyl, $C_1$-$C_8$-haloalkyl, $C_1$-$C_8$-alkoxy, $C_1$-$C_8$-haloalkoxy, $C_6$-$C_{14}$-aryl, in particular phenyl.

In an embodiment of the present invention, the carbocyclic, aromatic substituents are unsubstituted or substituted by up to three identical or different substituents per cycle selected from the group consisting of fluorine, $C_1$-$C_8$-alkyl, $C_1$-$C_8$-perfluoroalkyl, $C_1$-$C_8$-alkoxy, $C_1$-$C_8$-perfluoroalkoxy, and phenyl.

Examples of carbocyclic, aromatic substituents are phenyl, 2,4,6-trimethylphenyl and 2,6-dimethoxyphenyl.

The definitions given above including their areas of preference also apply analogously to $C_6$-$C_{14}$-aryl-diyl substituents.

As used herein and unless specifically stated otherwise, $C_3$-$C_{14}$-heterocyclyl denotes heterocyclic aliphatic, aromatic or mixed aliphatic and aromatic substituents in which no, one, two or three skeleton atoms per cycle, but at least one skeleton atom in the entire cyclic system is a heteroatom selected from the group consisting of nitrogen, sulphur and oxygen and whereby the entire cyclic system as such, i.e., without carbon atoms of substituents, comprises three to fourteen carbon atoms and whereby the heterocyclic aliphatic, aromatic or mixed aliphatic and aromatic substituents are unsubstituted or substituted by up to five identical or different substituents per cycle, whereby the substituents are selected from the same group as given above for carbocyclic aromatic substituents including the areas of preference.

Examples of heterocyclyl-substituents are pyridinyl, oxazolyl, thiophen-yl, benzofuranyl, benzothiophen-yl, dibenzofuranyl, dibenzothiophenyl, furanyl, indolyl, pyridazinyl, pyrazinyl, imidazolyl, pyrimidinyl and quinolinyl, either unsubstituted or substituted with up to three substituents selected from the group consisting of fluorine, $C_1$-$C_8$-alkyl, $C_1$-$C_8$-perfluoroalkyl, $C_1$-$C_8$-alkoxy, $C_1$-$C_8$-perfluoroalkoxy, and phenyl.

The definitions given above, including the examples, also apply analogously to $C_3$-$C_{14}$-heterocyclylium cations, the bivalent $C_3$-$C_{14}$-heterocyclo-diyl substituents and the bivalent $C_3$-$C_{14}$-heterocyclo-diylium cations.

Examples of $C_3$-$C_{14}$-heterocyclylium cations are N—($C_1$-$C_8$-alkyl)imidazolium or pyridinium cations.

Examples of $C_3$-$C_{14}$-heterocyclo-diylium cations are N,N-imidazol-diylium cations.

As used herein, and unless specifically stated otherwise, protected formyl is a formyl substituent which is protected by conversion to an aminal, acetal or a mixed aminal acetal, whereby the aminals, acetals and mixed aminal acetals are either acyclic or cyclic.

For example, protected formyl is 1,1-(2,4-dioxycyclopentanediyl).

As used herein, and unless specifically stated otherwise, protected hydroxyl is a hydroxyl radical which is protected by conversion to a ketal, acetal or a mixed aminal acetal, whereby the aminals, acetals and mixed aminal acetals are either acyclic or cyclic. A specific example of protected hydroxyl is tetrahydropyranyl (O-THP).

As used herein, and unless specifically stated otherwise, $C_1$-$C_{18}$-alkyl, $C_1$-$C_{18}$-alkanediyl, $C_1$-$C_{18}$-alkoxy, $C_1$-$C_8$-alkylthio, $C_2$-$C_{18}$-alkenyl, $C_2$-$C_{18}$-alkenediyl and $C_1$-$C_{18}$-alkinediyl are a straight-chain, cyclic either in part or as a whole, branched or unbranched alkyl, alkanediyl, alkoxy, alkylthio, alkenyl, alkenediyl and alkinediyl substituents having the given number of carbon atoms in the substituent as such, i.e., without carbon atoms of further, optionally present substituents or carbon atoms of functions interrupting the aforementioned substituents. As an example, a benzyl substituent represents a $C_1$-alkyl substituent substituted by phenyl.

The same analogously applies to $C_1$-$C_8$, $C_1$-$C_{24}$ and $C_6$-$C_{24}$-alkyl, $C_2$-$C_{18}$-alkanediyl, $C_3$-$C_{18}$-alkanetriyl $C_4$-$C_{18}$-alkanetetrayl, $C_2$-$C_{18}$-alkenediyl, $C_3$-$C_{18}$-alkenetriyl, $C_4$-$C_{18}$-alkenetetrayl and $C_2$-$C_{18}$-alkinediyl substituents.

Haloalkyl or haloalkoxy substituents denote alkyl or alkoxy substituents with the given number of carbon atoms which are once or more than once, for example, fully substituted by halogen.

Fluoroalkyl or fluoroalkoxy substituents denote alkyl or alkoxy substituents with the given number of carbon atoms which are once or more than once, for example, fully substituted by fluorine.

Perfluoroalkyl or perfluoroalkoxy substituents denote alkyl or alkoxy substituents with the given number of carbon atoms which are fully substituted by fluorine.

Specific examples of $C_1$-$C_8$-alkyl are methyl, ethyl, n-propyl, isopropyl, n-butyl, tert-butyl, n-pentyl, cyclohexyl, n-hexyl, n-heptyl, n-octyl and isooctyl. Additional examples for $C_1$-$C_{18}$-alkyl are norbornyl, adamantyl, n-decyl, n-dodecyl alkyl, n-hexadecyl, n-octadecyl.

Specific examples of $C_1$-$C_{18}$-alkanediyl-substituents are methylene, 1,1-ethylene, 1,2-ethylene, 1,1-propylene, 1,2-propylene, 1,3-propylene, 1,1-butylene, 1,2-butylene, 2,3-butylene, 1,4-butylene, 1,5-pentylene, 1,6-hexylene, 1,1-cyclohexylene, 1,4-cyclohexylene, 1,2-cyclohexylene and 1,8-octylene.

Specific examples of $C_1$-$C_8$-alkoxy-substituents are methoxy, ethoxy, isopropoxy, n-propoxy, n-butoxy, tert-butoxy and cyclohexyloxy.

Specific examples of $C_2$-$C_{18}$-alkenyl-substituents are allyl, 3-propenyl and buten-2-yl.

Specific examples of $C_2$-$C_{18}$-alkinyl-substituents are ethinyl, and 1,3-propinyl.

Polymerizable Monomers

The polymerization medium, in particular the heterophase medium further comprises one or more polymerizable monomers.

As used herein, the term polymerizable monomer encompasses all monomers which can be polymerized in a radical polymerization.

Polymerizable monomers can, for example, be selected from the group consisting of those of formula (IIa):

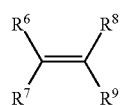

(IIa)

wherein,
$R^6$, $R^7$, $R^8$ and $R^9$ are independently of one another selected from the group consisting of:
hydrogen, cyano, fluorine, chlorine, bromine, iodine, $C_6$-$C_{14}$-aryl, $C_3$-$C_{14}$-heterocyclyl, $C_1$-$C_{18}$-alkoxy, $C_1$-$C_{18}$-alkyl, $C_2$-$C_{18}$-alkenyl and $C_2$-$C_{18}$-alkinyl, which is either directly bound to the double bond depicted in formula (IIa) or in case of $C_6$-$C_{14}$-aryl, $C_3$-$C_{14}$-heterocyclyl, $C_1$-$C_{18}$-alkyl, $C_2$-$C_{18}$-alkenyl and $C_2$-$C_{18}$-alkinyl alternatively via a functional group selected from the group consisting of:
—CO—, —OCO—, —O(CO)O—, $NR^4$(CO)—, —$NR^4$(CO)O—, —O(CO)$NR^4$—, —(CO)$NR^4$—, —$NR^4$(CO)$NR^4$—, —Si($R^5$)$_2$—, —OSi($R^5$)$_2$—, —OSi($R^5$)$_2$O—, —Si($R^5$)$_2$O—,
and
which is either not, once, twice or more than twice, interrupted by non-successive functional groups selected from the group consisting of:
—O—, —CO—, —OCO—, —O(CO)O—, $NR^4$(CO)—, —$NR^4$(CO)O—, —O(CO)$NR^4$—, —(CO)$NR^4$—, —$NR^4$(CO)$NR^4$—, —Si($R^5$)$_2$—, —OSi($R^5$)$_2$—, —OSi($R^5$)$_2$O—, —Si($R^5$)$_2$O—,
and which is additionally or alternatively either not, once, twice or more than twice, interrupted by bivalent residues selected from the group consisting of $C_3$-$C_{14}$-heterocyclo-diyl and $C_6$-$C_{14}$-aryldiyl,
and which is not, additionally or alternatively either once, twice or more than twice substituted by substituents selected from the group consisting of:
halogen, cyano, vicinal oxo (forming epoxides), vicinal $NR^5$ (forming aziridins), $C_6$-$C_{14}$-aryl; $C_3$-$C_{14}$-heterocyclyl, $C_1$-$C_8$-alkylthio, hydroxy, —$SO_2N$($R^4$)$_2$, $NR^4SO_2$—$R^5$, —N($R^4$)$_2$, —$CO_2N$($R^4$)$_2$, —$COR^4$, —$OCOR^4$, —O(CO)$OR^4$, $NR^4$(CO)$R^5$, —$NR^4$(CO)$OR^5$, O(CO)N($R^4$)$_2$, —$NR^4$(CO)N($R^4$)$_2$, —OSi($OR^5$)$_{y-3}$($R^5$)$_y$, —Si($OR^5$)$_{y-3}$($R^5$)$_y$, where y is 1, 2 or 3.
or wherein,
two residues of $R^6$, $R^7$, $R^8$ and $R^9$ together are:
$C_2$-$C_{18}$-alkanediyl or $C_3$-$C_{18}$-alkenediyl.

Polymerizable monomers of formula (IIa) can, for example, be selected from the group consisting of those wherein at two or three of the substituents $R^6$, $R^7$, $R^8$ and $R^9$ are hydrogen.

Examples of polymerizable monomers further include those of formula (IIb):

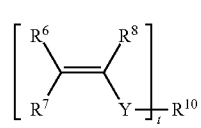

(IIb)

wherein,
$R^6$, $R^7$ and $R^8$ have the same meaning given above for formula (IIa),
or wherein,
two residues of $R^6$, $R^7$ and $R^8$ together are:
$C_2$-$C_{18}$-alkanediyl or $C_3$-$C_{18}$-alkenediyl,
and wherein,
t is an integer from 2 to 4, and
Y is missing such that $R^{10}$ is directly bound to the double bond depicted in formula (IIb) or is —CO— or —(CO)O—,
$R^{10}$ is a t-valent residue selected from the group consisting of $C_2$-$C_{18}$-alkanediyl (t=2), $C_3$-$C_{18}$-alkanetriyl (t=3), $C_4$-$C_{18}$-alkanetetrayl (t=4), $C_2$-$C_{18}$-alkenediyl (t=2), $C_3$-$C_{18}$-alkenetriyl (t=3), $C_4$-$C_{18}$-alkenetetrayl (t=4), $C_2$-$C_{18}$-alkinediyl (t=2), $C_6$-$C_{14}$-aryldiyl (t=2) and $C_3$-$C_{14}$-heterocyclodiyl (t=2).

Polymerizable monomers of formula (IIb) can, for example, be selected from the group consisting of those wherein at two or three of the substituents $R^6$, $R^7$, $R^8$ and $R^9$ are hydrogen.

Examples of polymerizable monomers include:

Monoolefins such as:

Acrylic acid and methacrylic acid and their respective esters, amides and nitriles, such as methyl-, ethyl-, n-butyl-, glycidyl-, 2-ethylhexyl- and 2-hydroxyethyl acrylate, acrylamide, N-isopropylacrylamide and acrylonitrile, and methyl-, ethyl-, n-butyl-, glycidyl-, 2-ethylhexyl-, 2-hydroxyethyl and isobornyl methacrylate; methacrylamide, N-isopropylmethacrylamide and methacrylonitrile;

other unsaturated carboxylic acids and their respective esters such crotonic acid, maleic acid, fumaric acid, itaconic acid, cinnamic acid and unsaturated fatty acids such as linolenic acid or oleic acid and the respective $C_1$-$C_8$-alkyl esters of the aforementioned acids and where applicable $C_1$-$C_8$-alkyl diesters;

vinyl ethers, such as ethyl vinyl ether and isobutyl vinyl ether;

vinyl esters, such as vinyl acetate;

vinyl aromatic compounds such as vinylpyridine, styrene and styrene substituted by $C_1$-$C_8$-alkyl- or halogen or sulfonic acid salts at the aromatic ring, for example, styrene, 2-, 3- and 4-methylstyrene, 2-, 3- and 4-bromomethylstyrene, 2-, 3- and 4-chlorostyrene and p-methoxystyrene; and siloxanes such as trimethoxyvinylsilane, triethoxyvinylsilane, and multiolefins such as:

poly(meth)acrylates such as ethylene glycol diacrylate, 1,6-hexanediol diacrylate, propylene glycol diacrylate, dipropylene glycol diacrylate, tripropylene glycol diacrylate, neopentyl glycol diacrylate, hexamethylene glycol diacrylate and bis-phenol-A diacrylate, 4,4'-bis(2-acryloyloxyethoxy)diphenylpropane, trimethylolpropane tri-acrylate, pentaerythritol triacrylate, pentaerythritol tetraacrylate, vinyl acrylate, polyethyleneglycol-mono-acrylate, polyethylene-glycol-diacrylate, ethylene glycol dimethacrylate, 1,6-hexanediol dimethacrylate, propylene glycol dimethacrylate, dipropylene glycol dimethacrylate, tripropylene glycol dimethacrylate, neopentyl glycol dimethacrylate, hexamethylene glycol dimethacrylate and bis-phenol-A dimethacrylate, 4,4'-bis(2-methacryloyloxyethoxy)diphenylpropane, trimethylolpropane tri-methacrylate, pentaerythritol trimethacrylate, pentaerythritol tetramethacrylate, vinyl methacrylate, polyethyleneglycol-mono-methacrylate, polyethylene-glycol-di-methacrylate;

other multiolefins such as butadiene, isoprene, chloroprene, 2,4-dimethylbutadiene, cyclopentadiene, methylcyclopentadiene, cyclohexadiene, divinyl-benzene, 1-vinyl-cyclohexadiene, norbornadiene, 2-isopropenyl-norbornene, 2-vinyl-norbornene, diisopropenylbenzene, divinyltoluene, divinylxylene and $C_1$ to $C_{20}$ alkyl-substituted derivatives of the aforementioned divinylaromatic multiolefins, divinyl succinate, diallyl phthalate, triallyl phosphate, triallyl isocyanurate, tris-(hydroxyethyl)isocyanurate triacrylate (Sartomer 368; from Cray Valley) and tris(2-acryloyl-ethyl)isocyanurate, ethyleneglycoldivinylether, diethyleneglycoldivinylether, triethylene-glycoldivinylether;

and any mixture of the aforementioned monoolefins and/or multiolefins.

In an embodiment of the present invention, monoolefins or mixtures of monoolefins of formula (IIa), for example, those monoolefins explicitly mentioned above are used, whereby butadiene, isoprene, chloroprene, methyl-, ethyl-, n-butyl- and 2-ethylhexylacrylate and methyl-, ethyl-, n-butyl- and 2-ethylhexylmethacrylate, acrylamide, acrylonitrile, vinylpyridine, styrene and styrene substituted by $C_1$-$C_8$-alkyl- or halogen or sulfonic acid salts at the aromatic ring, for example, styrene, 2-, 3- and 4-methylstyrene, 2-, 3- and 4-bromomethylstyrene, 2-, 3- and 4-chlorostyrene and p-methoxystyrene and any mixture of the aforementioned monoolefins.

In an embodiment of the present invention, where an aqueous phase is employed in step A) and B), in particular as dispersed phase or continuous phase, in a heterophase polymerization, the polymerizable monomer or the mixture of polymerizable monomers is used in an amount that the content of the polymerizable monomer or the mixture of polymerizable monomers dissolved in the said aqueous phase is less than 50 g/l, for example, less than 25 g/l, for example, less than 10 g/l and, for example, less than 2 g/l.

In an embodiment of the present invention, the polymerizable monomer or the mixture of polymerizable monomers is selected from those resulting in polymer nanoparticles having a glass transition temperature or a melting point or melting range higher than the polymerization temperature. This helps to avoid immediate agglomeration.

The weight ratio of photoinitiator to polymerizable monomer in the heterophase medium is typically of from 1:1 to 1:100,000, for example, between 1:5 and 1:100,000, for example, between 1:10 and 1:10,000 and, for example, 1:50 to 1:2,000.

In an embodiment of the present invention, the heterophase medium comprises a continuous aqueous phase and a dispersed organic phase, whereby the organic phase comprises the one or more polymerizable monomers.

In an embodiment of the present invention, if heterophase polymerization is applied in step B), the heterophase medium comprises a continuous aqueous phase and a dispersed organic phase, whereby the content of polymerizable monomer within the dispersed organic phase is 20 to 100 wt.-%, for example, 90 to 100 wt.-% and, for example, 98 to 100 wt.-% of one or more polymerizable monomers, whereby surfactants are not counted as being part of the organic phase.

Generally, in step A), the photoinitiator may be either added partially or completely. If in step A) the photoinitiator is added partially, the rest can be added during step B) either batchwise or continuously.

The Polymerization Conditions

In step B), the one or more polymerizable monomers present in the polymerization medium, in particular, in the heterophase medium are polymerized by irradiating said polymerization medium, in particular, in the heterophase medium, with electromagnetic radiation having a wavelength sufficient to induce the generation of radicals.

This includes wavelengths sufficient to induce the generation of radicals from:

at least the one or more photoinitiators employed and optionally;

at least one reaction product of radicals generated from said one or more photoinitiators with said one or more polymerizable monomers, for example, at least one reaction product of radicals comprising at least one phosphorous oxide (P=O) or phosphorous sulfide (P=S) group with said one or more polymerizable monomers; or from both of the aforementioned sources of radicals.

It is apparent to those skilled in the art that the electromagnetic radiation sufficient to induce the generation of radicals is dependent on the exact structure of the photoinitiator and/or the reaction product of radicals generated from the photoinitiator with the polymerizable monomers but can be determined by performing a few, commonly known simple measurements, tests or experiments.

Such tests include UV-Vis spectroscopy and radical scavenger experiments known to those skilled in the art.

As a consequence, and in order to carry out the process according to the present invention, one may either adapt the photoinitiators employed to a given source of electromagnetic radiation or vice versa.

With the photoinitiators used herein generation of radicals of any type mentioned above is typically induced by irradiation with electromagnetic radiation having a wavelength of below 500 nm, for example, below 480 nm, for example, in the range of 200 to 480 nm, for example, in the range of 280 to 480 nm.

Suitable sources of electromagnetic radiation having a wavelength sufficient to induce the generation of radicals include eximer lasers such as KrF and XeF-lasers; UV lamps like low-pressure, medium-pressure, high-pressure and super-high-pressure mercury lamps which can be undoped or doped, for example: with gallium iodide, thallium iodide or other metal halides; blue, violet-blue or UV-LEDs; concentrated, direct or indirect sunlight; xenon or xenon mercury arc lamps such as continuous-output xenon short- or long-arc lamps, flash lamps such as xenon or xenon mercury flash lamps; microwave-excited metal vapour lamps; excimer lamps, superactinic fluorescent tubes; fluorescent lamps; and noble gas incandescent lamps.

Examples of sources are UV lamps like low-pressure, medium-pressure, high-pressure and super-high-pressure mercury lamps which can be undoped or doped, for example, with gallium iodide, thallium iodide or other metal halides; blue, violet-blue or UV-LEDs, xenon or xenon mercury arc lamps such as continuous-output xenon short- or long-arc lamps.

In an embodiment of the present invention, multichromatic sources of electromagnetic radiation are used to generate radicals.

As used herein a multichromatic sources of electromagnetic radiation denotes a source emitting electromagnetic radiation having more than one relative emission maxima (also known as emission bands), for example, more than one relative emission maxima within the wavelength ranges disclosed above.

The irradiation time of the polymerization medium, in particular, the heterophase medium may vary depending on the intensity of irradiance and its penetration depth within the polymerization medium, in particular, the heterophase medium, but typically is for example in the range of from 5 min to 24 h.

In an embodiment of the present invention, irradiation of the polymerization medium, in particular, the heterophase medium, is effected in such a manner that the ratio of the irradiated surface of the polymerization medium, in particular, the heterophase medium and its volume (SVR) is at least 200 m$^{-1}$, for example, at least 600 m$^{-1}$, for example, at least 1000 m$^{-1}$, for example, at least 1500 m$^{-1}$.

Figure 2:
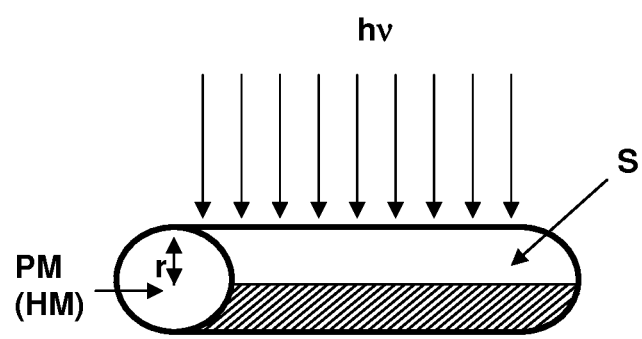
FIG. 2 shows a transparent round tube having an inner radius (r) irradiated from one direction (the dashed part of the surface is not irradiated)
Figure 3:
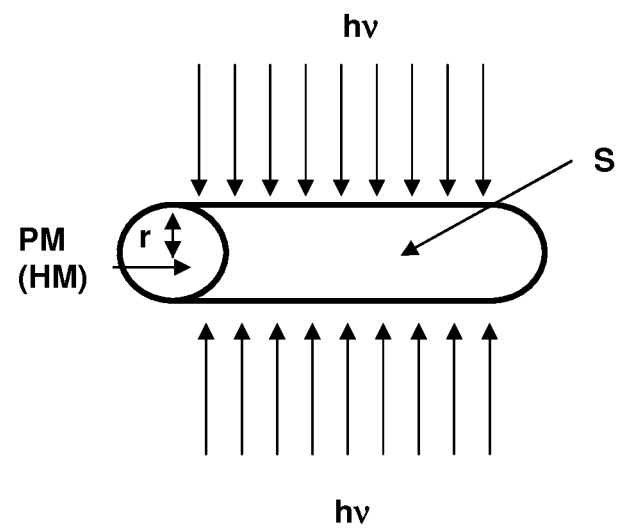
FIG. 3 shows a transparent round tube having an inner radius (r) irradiated from two directions.

FIGS. 1, 2 and 3 depict the examples given below, which are not intended to limit the spatial design of devices allowing the described SVR.

A ratio of the irradiated surface of the polymerization medium (PM), in particular, the heterophase medium (HM) and its volume of at least 200 m$^{-1}$ is, for example, achieved by irradiation of the surface (S) a of a thin film of polymerization medium, in particular, the heterophase medium (HM) having a uniform layer thickness (L) of 5 mm (see FIG. 1).

A ratio of the irradiated surface of the polymerization medium, in particular, the heterophase medium and its volume of at least 200 m$^{-1}$ is, for example, also achieved by irradiation of the surface a of a polymerization medium (PM), in particular, the heterophase medium (HM) confined in a transparent round tube having an inner radius (r) of 5 mm if irradiated from one direction (in this case the irradiated surface S is $\pi \cdot r \cdot l$, the volume $\pi \cdot r^2 \cdot l$ with l being the length of the irradiated tube or the irradiated part thereof) (see FIG. 2 in which the dashed part of the surface is not irradiated), or in a transparent round tube having a inner radius (r) of 10 mm if irradiated from two opposite directions (in this case the irradiated surface is the whole inner surface of $2\pi \cdot r \cdot l$, the volume is $\pi \cdot r^2 \cdot l$ with l being the length of the irradiated tube or the irradiated part thereof) (see FIG. 3).

It was surprisingly found that irradiation in the spatial dimensions described above significantly increases polymerization rates and, where heterophase polymerization is applied, also molecular weights of the polymer chains within the lattices.

In an embodiment of the present invention, in particular, where heterophase polymerization is applied, the irradiation is effected in a transparent tube, tubing or channel having an effective diameter of 5 mm or less, for example, 0.1 to 5 mm, for example, 2 mm or less, for example, 0.1 to 2 mm, for example, 1 mm or less, and for example, 0.1 to 1 mm.

As used herein, the effective diameter of a tube, tubing or channel, which is typically circular, but also might deviate from circular shape, is understood as the diameter of a circular tube, tubing or channel having the same cross sectional area.

In an embodiment of the present invention, in particular, where bulk or solution polymerization, for example, bulk polymerization is applied, the irradiation is effected by irradiating a thin film of polymerization medium having a layer thickness of 5 mm or less, for example 0.001 to 5 mm, for example, 2 mm or less, for example, 0.001 to 2 mm and more, for example, 1 mm or less, for example, 0.001 to 1 mm. Low layer thicknesses can, for example, be achieved by spin coating.

In an embodiment of the present invention, the irradiation time of the polymerization medium, in particular, the heterophase medium, is therefore typically, for example, in the range of from 1 s to 30 min, for example, from 5 s to 15 min, and, for example, from 10 s to 3 min. Longer exposure times than 30 min typically do not positively affect the monomer conversion.

In an embodiment of the present invention, the irradiance with electromagnetic radiation sufficient to induce the generation of radicals is effected at average intensities of at least 50 W per square meter of irradiated surface of the polymerization medium, in particular, the heterophase medium (50 W/m$^2$), for example, at least 100 W/m$^2$, for example, from 200 W/m$^2$ to 50 kW/m$^2$ and, for example, from 200 W/m$^2$ to 10 kW/m$^2$.

In an embodiment of the present invention, irradiance is effected with electromagnetic radiation having a wavelength of below 500 nm at average intensities of at least 50 W per square meter of irradiated surface of the polymerization medium, in particular, the heterophase medium (50 W/m$^2$), for example, at least 100 W/m$^2$, for example, from 200 W/m$^2$ to 50 kW/m$^2$ and, for example, from 200 W/m$^2$ to 10 kW/m$^2$.

In an embodiment, the SVR is, for example, at least 600 m$^{-1}$, for example, at least 1000 m$^{-1}$, and, for example, at least 1500 m$^1$.

In an embodiment of the present invention, irradiance is effected with electromagnetic radiation having a wavelength of below 480 nm at average intensities of at least 50 W per square meter of irradiated surface of the polymerization medium, in particular, the heterophase medium (50 W/m$^2$), for example, at least 100 W/m$^2$, for example, from 200 W/m$^2$ to 50 kW/m$^2$ and, for example, from 200 W/m$^2$ to 10 kW/m$^2$. In an embodiment, the SVR can, for example, be at least 600 m$^{-1}$, for example, at least 1000 m$^{-1}$, and, for example, at least 1500 m$^{-1}$.

In an embodiment of the present invention, irradiance is effected with electromagnetic radiation having a wavelength in the range of 280 to 480 nm at average intensities of at least 200 W per square meter of irradiated surface of the polymerization medium, in particular, the heterophase medium (50 W/m$^2$), for example, at least 100 W/m$^2$ for example, from 200 W/m$^2$ to 50 kW/m$^2$ and, for example, from 200 W/m$^2$ to 10 kW/m$^2$. In an embodiment, the SVR can, for example, be at least 600 m$^{-1}$, for example, at least 1000 m$^{-1}$, and, for example, at least 1500 m$^{-1}$.

In an embodiment of the present invention, step B) is carried out with
- a SVR of at least 600 m$^{-1}$, for example, at least 1000 m$^{-1}$, and, for example, at least 1500 m$^{-1}$
- an irradiance with electromagnetic radiation having a wavelength of below 500 nm at average intensities of at least 50 W per square meter of irradiated surface of the polymerization medium, in particular, the heterophase medium (50 W/m$^2$), for example, at least 100 W/m$^2$, for example, from 200 W/m$^2$ to 50 kW/m$^2$ and, for example, from 200 W/m$^2$ to 10 kW/m$^2$
- for 1 s to 30 min, for example, from 5 s to 15 min and, for example, from 10 s to 3 min.

In an embodiment of the present invention, step B) is carried out with
- a SVR of at least 1000 m$^{-1}$, for example, at least 1500 m$^{-1}$
- an irradiance with electromagnetic radiation having a wavelength of below 480 nm at average intensities of at least 50 W per square meter of irradiated surface of the polymerization medium, in particular, the heterophase medium (50 W/m$^2$), for example, at least 100 W/m$^2$, for example, from 200 W/m$^2$ to 50 kW/m$^2$ and, for example, from 200 W/m$^2$ to 10 kW/m$^2$
- for 5 s to 15 min, for example, from 10 s to 3 min.

In an embodiment of the present invention, step B) is carried out with
- a SVR of at least 1000 m$^{-1}$, for example, 1500 m$^{-1}$
- an irradiance with electromagnetic radiation having a wavelength in the range of 280 to 480 nm at average intensities of at least 50 W per square meter of irradiated surface of the polymerization medium, in particular, the heterophase medium (50 W/m$^2$), for example, at least 100 W/m$^2$, for example, 200 W/m$^2$ to 50 kW/m$^2$ and, for example, from 200 W/m$^2$ to 10 kW/m$^2$
- for 5 s to 15 min, for example, from 10 s to 3 min.

The determination of a suitable reaction temperature range during polymerization depends on the composition of the polymerization medium, for example, where a heterophase medium is employed on the composition of the continuous phase, the composition of the dispersed phase and the reaction pressure since freezing or boiling in the polymerization medium should be avoided, in particular, when the continuous phase or the dispersed phase is an aqueous phase within a heterophase medium.

Generally, a typical reaction temperature range to carry out the polymerization according to step B) is from −30° C. to 120° C., for example, from −10 to 80° C. and, for example, from 0 to 50° C.

A typical reaction pressure range to carry out the polymerization according to step B) is from 100 hPa to 10 MPa, for example, from 500 hPa to 1 MPa.

In an embodiment of the present invention, the polymerization carried out such that a monomer conversion of 60 to 100 wt-% of the polymerizable monomers is achieved, for example, 90 to 100 wt.-%.

Step B) can be carried out batchwise or continuously, whereby step B) is, for example, carried out continuously using a flow-through reactor if a heterophase medium is applied.

In those embodiments where a flow-through reactor is employed, the flow rate is adjusted to an average flow velocity of 0.005 to 1 m/s, for example, 0.01 to 0.5 m/s.

In an embodiment of the present invention, where a heterophase medium is employed, the lattices comprise 0.001 to 50 wt-%, for example, 0.001 to 25 wt-% and, for example, 0.5 to 20 wt-% of the aforementioned polymer nanoparticles.

The molecular weight of the polymer chains within the polymer nanoparticles typically have a weight average molecular mass of more than 500 kg/mol to 5,000 kg/mol, for example, 1,000 kg/mol to 5,000 kg/mol.

The average particle sizes experimentally obtained are typically in the range of from 30 to 150 nm as measured by Dynamic Light Scattering (DLS) using a Nicomp particle sizer (PSS Santa Barbara, USA, model 370) at a fixed scattering angle of 90°.

The lattices comprising polymer nanoparticles obtained typically have an M-PDI of 1.1 to 20, for example, an M-PDI of 2 to 10.

The lattices comprising polymer nanoparticles further typically have a very low DLS-PDI of 0.05 to 0.40, for example, a DLS-PDI of 0.08 to 0.20. Step C) might directly be carried out after performance of step B).

In an embodiment of the present invention, residual polymerizable monomers, if present at all (see above), are removed from the resulting polymer or dispersion by standard stripping or distillation techniques.

In an embodiment of the present invention, in particular, where solution or heterophase polymerization was applied in step B), the polymer or polymer nanoparticles can be concentrated in or isolated from the polymerized medium or the lattices using standard techniques well known to those skilled in the art and subsequently directly or after re-dispersion employed in step C).

Where solution or bulk polymerization was applied in step B), the preparation of modified nanoparticles can be effected by first preparing a solution of the polymer or taking the solution obtained via solution polymerization and adding the solution to a solvent or a solvent to the polymer solution, wherein the solvent or the polymer is only sparingly soluble which leads in a manner known per se to formation of lattices, in particular, if additional surfactants and/or high shear forces are applied. The original solvent of the polymer solution can, for example, be removed via standard techniques such as distillation.

In an embodiment of the present invention, the polymer obtained in step B) is purified before its employment in step C). The purification can be effected, for example, by precipitation, dialysis or any other manner known to those skilled in the art.

To concentrate or isolate the polymer nanoparticles, inorganic salts or solutions thereof are, for example, added to the suspension and the resulting mixture is subjected to centrifugation, sedimentation, filtration or other separation processes of a like nature.

In an embodiment of the present invention, the concentration or isolation is performed by nano- or microfiltration using membranes.

In step C), the polymers, in particular, the lattices or polymer nanoparticles obtained in step B), are modified by irradiating said polymers, in particular, the lattices or polymer nanoparticles, with electromagnetic radiation having a wavelength sufficient to induce the generation of radicals from said polymers and, in particular, from said lattices or polymer nanoparticles in the presence of at least one modifying agent.

Surprisingly, said modification does not require additional photoinitiators, for example, those of formula (I) or additional photoinitiators known to those skilled in the art since the polymers, in particular, the lattices and the polymer nanoparticles, obtained according in step B) were found to act as photoinitiators themselves. Therefore, in an embodiment, step C) is carried out without additional photoinitiators, in particular, without additional photoinitiators of formula (I) and, in an embodiment, in absence of photoinitiators of formula (I).

As used herein a modifying agent is any compound that is able to react with radicals generated by irradiation of the polymers, in particular, of the lattices or polymer nanoparticles obtained in step B).

In an embodiment of the present invention, polymerizable monomers as defined above are used as modifying agents, whereby, for example, the polymerizable monomers used in step C) are different from those taken in step A) and B).

If monoolefins or conjugated diolefins are employed as polymerizable monomers in step C) block copolymers are obtained.

If multiolefins, in particular, non-conjugated crosslinkers are employed as polymerizable monomers in step C), crosslinked polymers are obtained.

If mono- or multiolefins carrying functional groups are employed telechelic polymers or functionalized block copolymers can be obtained.

Examples of such mono- or multiolefins carrying functional groups include hydroxyfunctionalized (meth)acrylates such as 3-hydroxypropyl(meth)acrylate, 3,4-dihydroxybutylmono(meth)acrylatd, 2-hydroxyethyl(meth)acrylat, 4-Hydroxybutyl (meth)acrylat, 2-Hydroxypropylmeth)acrylat and 2,5-dimethyl-1,6-hexandiolmono(meth)acrylate.

aminofunctionalized (meth)acrylates such as 2-dimethylaminoethyl-(meth)acrylate (DMAEMA), 2-diethylaminoethyl-(meth)acrylate (DEAEMA), 2-tert-butylaminoethyl-(meth)acrylate (t-BAEMA), 2-dimethylaminoethyl-acrylate (DMAEA), 2-diethylaminoethyl-acrylate (DEAEA), 2-tert-butylaminoethyl-acrylate (t-BAEA), 3-dimethylaminopropyl-methacrylamide (DMAPMA) and 3-dimethylaminopropyl-acrylamide (DMAPA)

unsaturated functionalized (meth)acrylates such as allyl (meth)acrylate epoxy functionalized (meth)acrylates such as glycidyl (meth)acrylate.

carboxylic acid functionalized (meth)acrylates such as tert-butyl(meth)acrylate which may be subjected to saponification or thermal degradation to obtain carboxylic acid groups silicon functionalized (meth)acrylates such as 3-methacryloxypropyltrimethoxysilane.

In an embodiment of the present invention, radical scavengers are used as modifying agents. In this case, chain degradation occurs which lowers the average molecular weight of the polymer, in particular, of the latex.

For the irradiation in step C), the same conditions may be applied in any aspect as described for step B).

Step C) may be repeated once or more for example to obtain tri- or multiblock copolymers if different monoolefins or conjugated diolefins are employed as polymerizable monomers in every repeat of step C).

Mechanistic Aspects

In order to provide a better understanding of the present invention, some mechanistic aspects are discussed, which, however, shall in no way be binding or be deemed a limiting feature.

The mechanism of classical photoinitiated polymerizations, in particular, heterophase polymerizations such as aqueous emulsion polymerization is rather well understood. The parameters that influence the reaction have been determined, including the relative influences of monomer, initiator, temperature and reaction time on the resulting polymer molecular weight and other features.

Upon exposure to electromagnetic radiation, the photoinitiators used herein undergo exitation to the singlet state, electron-spin reversal to the triplet state and fragmentation thereby forming at least two radicals.

A possible explanation for generation of radicals in step B) or C), in particular, the avalanche-like generation of radicals when using high SVRs, is given below using a photoinitiator of the bisacylphosphine oxide (BAPO) type as an example:

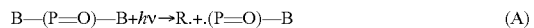 (A)

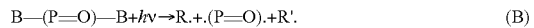 (B)

Residues B denote two acyl substituents of the photoinitiator, the third substituent was omitted for clarity. Radical formation and reaction may, depending on its nature, however, occur in the same manner as discussed for B.

"hv" denotes electromagnetic radiation having a wavelength sufficient to induce the generation of the radicals depicted in the respective formulae.

After initial fragmentation of the photoinitiator, the polymerization is then started and propagated by reaction of the radicals formed according to equations (A) and (B) with n molecules of polymerizable monomer M.

 (C)

 (D)

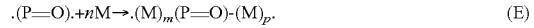 (E)

(with m+p=n)

Termination occurs inter alia by radical combinations which limit the rate of conversion by lowering the number of free radicals present in the reaction mixture. Such termination reactions by radical combination include, for example:

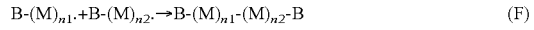 (F)

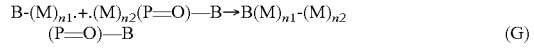 (G)

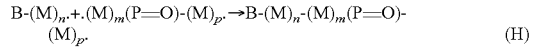 (H)

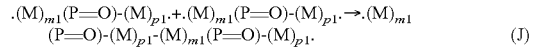 (J)

According to equations (E), (H) and (J), incorporation of a phosphine oxide containing moiety into the growing polymer chain occurs.

The polymers formed according to equations (D) and (G) under irradiation can undergo further scission of an acyl substituent resulting in the formation of further radicals:

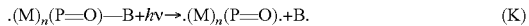   (K)

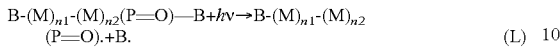   (L)

Under the irradiation conditions with high SVRs, the dramatic increase in reaction rate is proposed to be caused by further fast fragmentation of polymer chains resulting, for example, from reactions according to equations (E), (H) and (J):

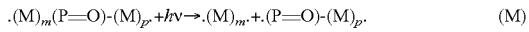   (M)

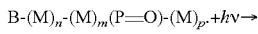

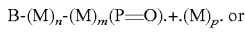   or

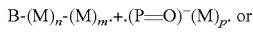   or

   (N)

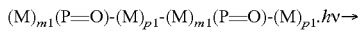

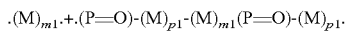

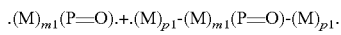

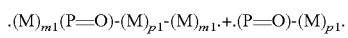

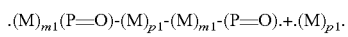

etc.   (P)

The radicals so generated may further react with monomers M in analogy to the propagation reactions depicted in equations (C), (D) and (E).

For heterophase polymerizations, a commonly used descriptor of radical heterophase polymerization is the average number of radicals per particle ($\bar{n}$). This value depends on particle size and concentration, the rates of initiator decomposition, and radical entry into and exit out of particles. Classical emulsion polymerization of polystyrene and other polymers for example produces particles of less than 100 nm diameter, each of which contain, on average, one half radical per particle ($\bar{n}$=0.5). Such reactions are said to conform to so-called zero-one kinetics, where each particle contains either one or no growing radical (see Ugelstad, J., Mork, P. C. & Aasen, J. O. Kinetics of Emulsion Polymerization. J. Polym. Sci., A: Pol. Chem. 5, 2281-2288 (1967)). As will be shown in the examples, the repeated chain scission and avalanche-like radical generation discussed above leads to average number of radicals per particle ($\bar{n}$) of up to 30, which explains the ultra-fast reaction rates and high molecular weights observed.

In an embodiment of the present invention, therefore, the generation of radicals of at least one reaction product of radicals generated from the one or more photoinitiators with the one or more polymerizable monomers occurs via scission of a phosphorous-carbon-bond of reaction products comprising a phosphorous oxide (P=O) or phosphorous sulphide (P=S) group.

In case photoinitiators of formula (I) are employed in which m is 1 or 2, and in particular 2, the radical generation of at least one reaction product of said radicals with said one or more polymerizable monomers is, for example, meant to denote a radical generation other than by scission of a phosphorous-carbon bond between the (X=P) and the (C=O)—$R^2$ group.

In step C), the polymer chains finally formed in step B) are under irradiation fragmented again to form radicals as for example shown in equation (Q):

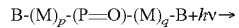

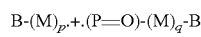

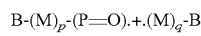   (Q)

In the presence of a modifying agent representing, for example, a further monomer, block copolymers are formed:

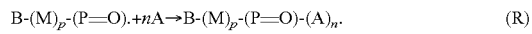   (R)

   (S)

Analogously, crosslinked polymers are obtainable if the modifying agent is a crosslinker, chain fragmentation is effected if the modifying agent is a radical scavenger.

Devices Suitable to Perform Steps B) and C)

The process can be carried out using every type of device designed to carry out step B) and/or step C) and optionally also step A) under the conditions described hereinabove.

This includes photoreactors known to those skilled in the art having irradiation zones and, in particular, those with dimensions to allow irradiation in with the prescribed SVR.

Suitable types of photoreactors include rising or falling film photoreactors and flow-through reactors, in particular, microfluidic devices, in particular, if solution polymerization or heterophase polymerization is applied.

Bulk polymerizations are typically performed batchwise. Flow-through reactors may be any device comprising in flow direction an inlet, at least one irradiation zone comprising a wall material transparent to the electromagnetic radiation employed such as simple tubes, tubings or hoses and an outlet as well as means to convey the polymerization medium, in particular, the heterophase medium form the inlet via the at least one exposure zone to the outlet such as pumps. In particular, the at least one irradiation zone has a SVR of 200 m$^{-1}$, for example, at least 600 m$^{-1}$, for example, at least 1000 m$^{-1}$ and, for example, at least 1500 m$^{-1}$.

Suitable wall material transparent to the electromagnetic radiation generating radicals include polyolefins such as fluorinated polyolefins such as fluorinated poly(ethylene-co-propylene), hereinafter also denoted as FEP, and polytetrafluoroethylene, polyesters (including polycarbonates), polyacrylates, polyurethanes and glass such as quartz glass, borax containing glasses and other glasses which are at least partially transparent to the electromagnetic radiation employed.

Examples of suitable flow-through reactors include the flow-through reactors described in US2008/013537, US2003/0118486 and US2003/0042126.

In an embodiment of the present invention, the flow-through reactors further comprise at least one mixing device to carry out step A) which is in flow direction arranged before the at least one exposure zone.

Said mixing zones may be equipped with the standard mixing elements mentioned above. In an embodiment of the present invention, the mixing zone comprises static mixing elements such as slit type mixers.

Figure 4:
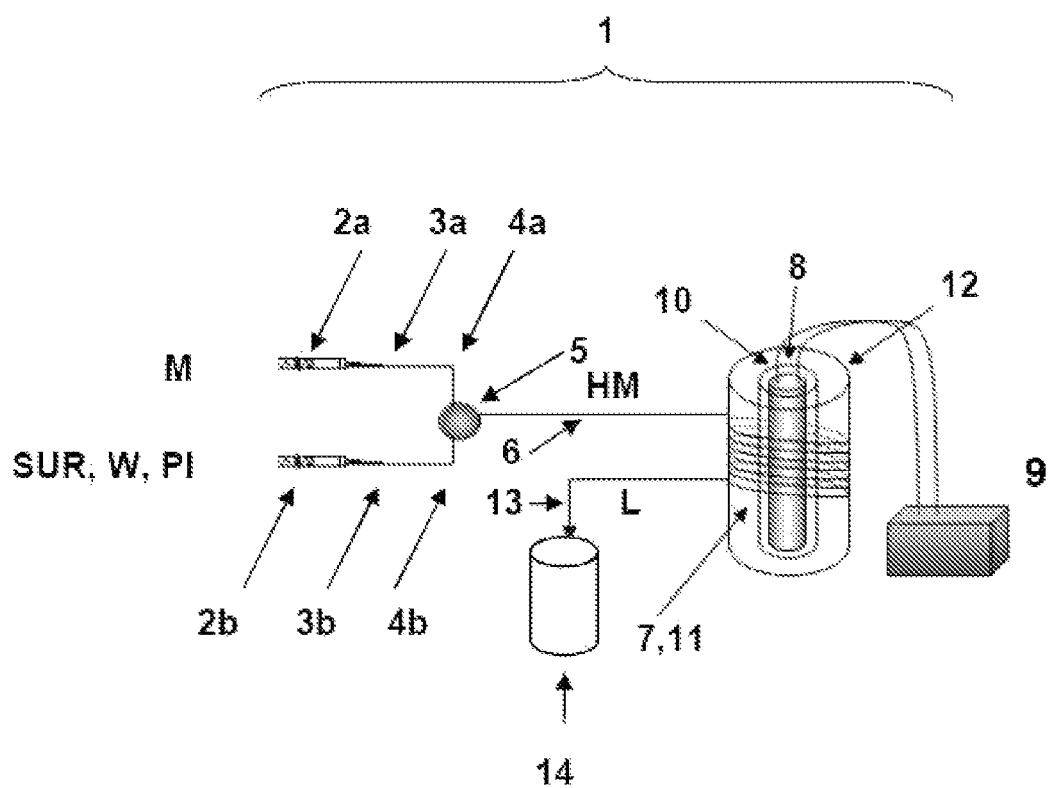
FIG. 4 shows an exemplary, simplified flow diagram of a process according to the present invention using a flow through reactor.
Figure 5:
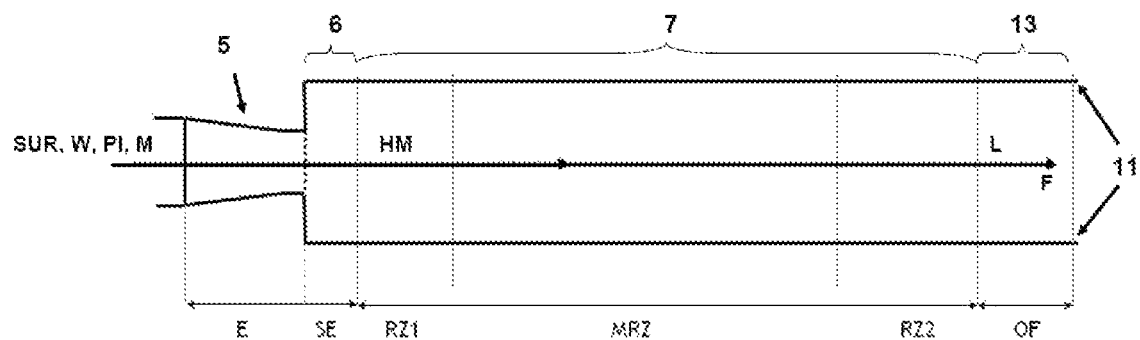
FIG. 5 shows a detailed cross-sectional view of a flow-through reactor used to carry out the experiments of the present invention.

FIGS. 4 and 5 further illustrate suitable devices to carry out the present invention.

FIG. 4 is an exemplary, simplified flow diagram of a process according to the present invention using a flow through reactor 1.

The feeding system comprises a storage tank 2a for the monomers to be polymerized and a storage tank 2b for water W, surfactant SUR and photoinitiator PI. Feed stream controller comprising conveying means 3a and 3b are employed to feed the monomers M, water W, surfactant SUR and photoinitiator PI via lines 4a and 4b through a mixing device 5 to form a heterophase medium HM. The heterophase medium HM is then fed via feed line 6 further to irradiation zone 7 which is irradiated by a source of electromagnetic radiation 8 powered by power source 9 and shielded by a filter 10 through the UV transparent wall material 11. Cooling of the heterophase medium HM is effected by cooling means 12 After leaving the exposure zone 7 the resulting latex comprising polymer nanoparticles L is transferred via exit line 13 to collection tank 14 for further workup or storage.

FIG. 5 is an exemplary, detailed cross sectional view of a flow-through reactor used to carry out the experiments.

The combined feed streams comprising water W, surfactant SUR, photoinitiator PI and monomer M, are fed to mixing device 5 to form the heterophase medium HM. Via feed line 6, the heterophase medium HM is, in flow direction F, further conveyed to irradiation zone 7 and exits the flow-through reactor 1 via exit line 13. Feed line 6, irradiation zone 7 and exit line 13 are designed as a tube from a single piece of a UV transparent wall material 11.

Emulsion E takes place inside the mixing device 5 typically resulting in a main drop size of below 100 μm. Relaxing and spontaneous emulsification SE occurs after passing the mixing device 5 in feed line 6 and typically leads to sub-μm drops.

Irradiation is effected in three zones: In reaction zones RZ1 and RZ2, where irradiation is carried out without cooling and in the main reaction zone MRZ, where irradiation is carried out by cooling means 12. The total irradiation zone TIZ consists of RZ1, RZ2 and MRZ.

The outflow zone OF is exit line 13.

It is evident that the device described above is also suitable to perform step C). In an embodiment, two reactors are connected in series to perform steps A), B) and C) continuously.

Products and Other Aspects of the Present Invention

As a result of the polymerization of step B) polymers, in particular lattices comprising nanoparticles are obtained which are further modified in step C).

In an embodiment of the present invention, the aforementioned modified polymers and, in particular, the modified lattices or polymer nanoparticles can be used, for example, in coatings, adhesives such as adhesives for laminated glass, inks, painting materials, precision mold constructions, in the manufacture of electronic articles, for drug delivery systems, diagnostic sensors and contrast agents.

A further aspect of the present invention therefore relates to coatings, adhesives, inks, and painting materials, precision mold constructions, electronic articles, drug delivery systems, diagnostic sensors and contrast agents comprising the modified polymers and, in particular, the modified polymer nanoparticles obtained according to the process described herein.

One important achievement is that the polymers obtained according to step B) simultaneously serve as a building block and as photoinitiator in step C). The present invention therefore further encompasses the use of polymers comprising phosphorous oxide or phosphorous sulfide groups in the main polymer chain as photoinitiators.

In an embodiment of the present invention, the present invention relates to polymers having at least one phosphorous oxide or phosphorous sulfide group within the main polymer chain per 10,000 repeating units derived from the monomer or monomers employed in step B), for example, per 1,000 repeating units, for example, per 100 repeating units, and the use of aforementioned polymers as photoinitiators.

The present invention is further illustrated by the examples without being limited thereto.

EXAMPLES

I. General Materials and Methods

The water used throughout was purified using a Seral purification system (PURELAB Plus) or an Integra UV plus (SG Reinstwassersysteme) system with a conductivity of 0.06 μS cm$^{-1}$. Sodium dodecyl sulfate (SDS) (Roth) was used as a surfactant, unless stated otherwise, and was used as received. The monomers were distilled under reduced pressure and stored refrigerated prior to use. The water-soluble photoinitiator 2-(bis(2,4,6-trimethylbenzoyl)phosphoryl)acetic acid sodium salt (BAPO-AA-Na) was prepared as described in: T. Ott, Dissertation ETH Zürich No. 18055, 2008. 2,4,6-Trimethylbenzoyl-diphenylphosphineoxide (Lucirin TPO, MAPO) and bis(2,4,6-trimethylbenzoyl)-phenylphosphineoxide (Irgacure® 819) were obtained from BASF SE, Germany.

The Continuous Flow-Through Reactor

A microfluidic device as shown in FIGS. 4 and 5 was used as continuous flow reactor (1) for photoinitiated emulsion polymerization.

The feeding system consisted of two gas-tight syringes (2a, 2b), one 2.5 mL syringe for the monomer (M) and a 10 mL syringe for the aqueous phase containing water (W) photoinitiator (PI) and sodium dodecylsulfate (SUR). Two syringe pumps (3a, 3b) were used to feed the reagents through a micromixer (5) and to convey the emulsion formed therein (HM) further through the feed line (6), irradiation zone (7) and exit line (13) to a collection flask (14). The emulsion (HM) was prepared in a countercurrent micromixer (5) (SSIMM) with an inlet channel inner diameter of 45 μm and an outlet channel inner diameter of 30 μm. For this micromixer and a 4 mL/min flow rate, the monomer droplet size distribution was quite broad, however, droplets below 1 μm were also formed, as was confirmed by light microscopy.

The feed line (6), the exposure zone (7), and the exit line (13) was commonly formed by a tube of fluorinated poly (ethylene-co-propylene) (FEP), a UV transparent material (12) with an outer diameter of 1.590 mm and an inner diameter of 0.762 mm.

A medium pressure mercury lamp with an arc length of 27.9 cm (450 W, Hanovia) was used as a source of electromagnetic radiation (8, 9), shielded by a 1 mm thick pyrex glass filter (10).

The medium pressure mercury lamp was placed inside a quartz cooling jacket (12) and the FEP tube was wound around this set-up to form the irradiation zone (7).

The average irradiation intensity, calculated on the hemicircular surface of the heterophase medium within the FEP tube i.e., also including adsorption of the quartz cooling jacket, the FEP tube and the pyrex filter) was:

168 W/m$^2$ at 578.0 nm, 201 W/m$^2$ at 546.1 nm 144 W/m$^2$ at 435.8 nm, 75 W/m$^2$ at 404.5 nm, 147 W/m$^2$ at 366.0 nm, 10 W/m$^2$ at 334.1 nm, 41 W/m$^2$ at 313.0 nm, 15 W/m$^2$ at 302.5 nm, 6 W/m$^2$ at 296.7 nm and 1 W/m$^2$ at 289.4 nm.

Therefore, the irradiation intensity for the electromagnetic radiation having a wavelength of below 500 nm or below 480 nm or in the range of 200 to 480 nm or in the range of 280 to 480 nm was in each case 439 W/m².

The temperature in the tube during the reaction was in the range from 25 to 30° C., based on temperature measurements taken between the quartz cooling jacket (12) and the tube (7).

Volumes

Total FEP tube volume was 2.7 mL.

E: emulsification takes place inside the micro-mixer resulting in a main drop size of below 100 μm. The mixing system used was a Standard Slit Interdigital Micro Mixer (SSIMM), and was made of 15 lamellae each with a height of 200 μm, width of 45 μm, and outflow width of 30 μm.

SE: relaxing and spontaneous emulsification after micromixer typically into sub-μm drops.

RZ1, 2: irradiation zones, irradiation without cooling.

MRZ: main irradiation zone, wound around cooler,

TIZ (total irradiation zone)=RZ1+MRZ+RZ2=2.432 mL

OF: outflow zone

The SVR of the TIZ was calculated to be 2625 m$^{-1}$.

Flow Rates and Residence Times

Flow rates of 4 mL/min, 2 mL/min, and 1 mL/min were employed leading to residence times in the total irradiation zone (TIZ) and thus irradiation times of 36 s, 72 s and 144 s, respectively Latex Characterization Samples were purified for further characterization by repeated reprecipitation from tetrahydrofurane in methanol followed by intense washing with distilled water.

Solid content was determined using a HR73 Halogen Moisture Analyzer (Mettler Toledo). Average particle size (intensity-weighted diameter) was determined with a Nicomp particle sizer (PSS Santa Barbara, USA, model 370) at a fixed scattering angle of 90°.

Molecular weight distributions (MWD) were determined by gel permeation chromatography (GPC) and were used to calculate weight and the number of average molecular weight polymers (Mw, Mn). GPC was carried out by injecting 100 μL polymer solutions (solvent tetrahydrofuran (THF)) through a Teflon-filter with a mesh size of 450 nm into a Thermo Separation Products set-up equipped with ultra violet (UV) (TSP UV1000), and refractive index (RI) (Shodex RI-71) detectors in THF at 30° C. with a flow rate of 1 mL/min. A column set was employed, which consisted of three 300×8 mm columns filled with a MZ-SDplus spherical polystyrene gel (average particle size 5 μm), with pore sizes of $10^3$, $10^5$, and $10^6$ Å, respectively. Average molecular weights, and number of average molecular weight polymers (Mw and, Mn) were calculated based on polystyrene standards (between 500 and 2·10⁶ g mol-1 from PSS, Mainz, Germany).

II. Photoinitiated Heterophase Polymerization

Synthesis of Lattices According to Steps A) and B)

All examples were made according to the following procedure: Sodium dodecylsulfate (SDS), the monomer (2.5 g), degassed water (10.0 g) and the photoinitiator (PI) were fed into and conveyed through the reactor and irradiated. The temperature during irradiation was 25° C. for all examples.

Example 1

Monomer: styrene

Photoinitiator: 2,4,6-trimethylbenzoyl-diphenylphosphineoxide (MAPO)

| Ex. | SDS [mg] | PI [mg] | Irradiation time [s] | Flow rate (μl/min) | DLS [nm] | Solid content [%] | Yield [%] |
|---|---|---|---|---|---|---|---|
| 1 | 300 | 10 | 36 | 4000 | 61 | 12 | 62 |

Examples 2 to 5

Monomer: styrene

Photoinitiator: 2-(bis(2,4,6-trimethylbenzoyl)phosphoryl)acetic acid sodium salt (BAPO-AA-Na)

| Ex. | SDS [mg] | PI [mg] | Irradiation time [s] | Flow rate (μl/min) | DLS [nm] | Solid content [%] | Yield [%] |
|---|---|---|---|---|---|---|---|
| 2 | 200 | 10 | 36 | 4000 | 51 | 15 | 79 |
| 3 | 300 | 10 | 36 | 4000 | 45 | 19 | 100 |
| 4 | 400 | 10 | 36 | 4000 | 38 | 20 | 100 |
| 5 | 500 | 10 | 36 | 4000 | 45 | 19 | 100 |

III. Modification of Polymer Nanoparticles

Examples 6 and 7

The lattices obtained according to Examples 1 (to result in Example 6) and 3 (to result in Example 7) were purified by extensive dialysis, however retaining colloidal stability. The lattices were then swollen with butylmethacrylate (BMA) overnight while gently stirring only the latex phase with a magnetic stir bar. Formation of macroscopic droplets of BMA was avoided. A latex sample (2 mL) was collected carefully from the bottom of the vial with a pipette in order not to drag swelling agent. The swollen particles were placed in a 6 mL glass flask and irradiated for 2 h while the flask was gently shaken. The latex was characterized to determine the solids content, average particle size, and molecular weight distribution.

Figure 6:
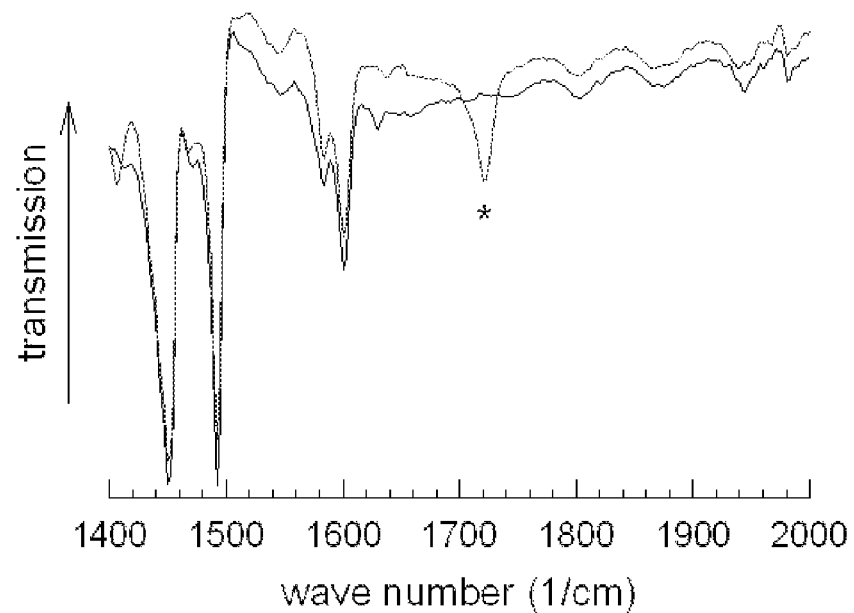
FIG. 6 shows FT-IR spectroscopic analyses of the lattices of Examples 1 and 3 and of the modified polymers after performing step C)
Figure 7:
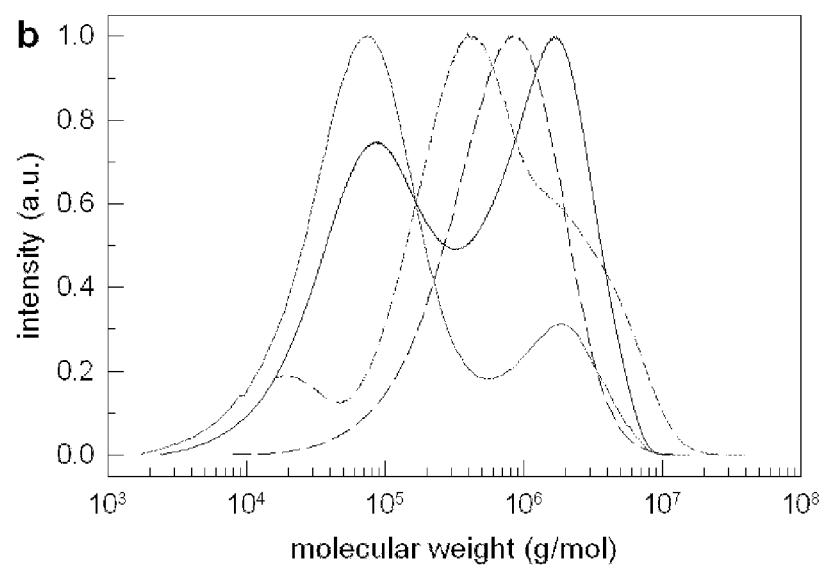
FIG. 7 shows the molecular weight distribution (MWD) of the modified polymers determined by size exclusion chromatography (SEC)

The results are illustrated in FIGS. 6 and 7.

The latex according to Example 6 (thin dashed lines) and the latex according to Example 7 in BMA emulsion (thin solid lines). The molecular weight distribution of the starting polymer is given in bold dashed lines (Example 1) and bold solid lines (Example 3), respectively.

The molecular weight distribution (MWD) of the modified polymers were determined by size exclusion chromatography (SEC). A significant change in molecular weight distribution (MWD) occurs after irradiation in either case as can be seen in FIG. 7.

Furthermore, FT-IR spectroscopic analyses of the lattices of Examples 1 and 3 and of the modified polymers after performing step C) in FIG. 6 demonstrate that an IR absorption of the carbonyl stretching frequency (*) appears proving that photo-induced modification of the lattices yielded block copolymers of styrene and BMA.

As a control, styrene and BMA were irradiated for two hours but did not polymerize in the absence of the lattices of Examples 1 and 3.

IV Photoinitiated Bulk Polymerization

Examples 8 and 9

Synthesis of Unmodified Polymers According to Steps A) and B)

A polymerization medium consisting of styrene and bis(2,4,6-trimethylbenzoyl)-phenylphosphineoxide were bulk polymerized in a weight ratio of 250:1 (Example 8) and 2.5:1 (Example 9) by irradiating it with the following light source: Osram, L18 W, light color 840, lumilux, cool white.

Figure 8:
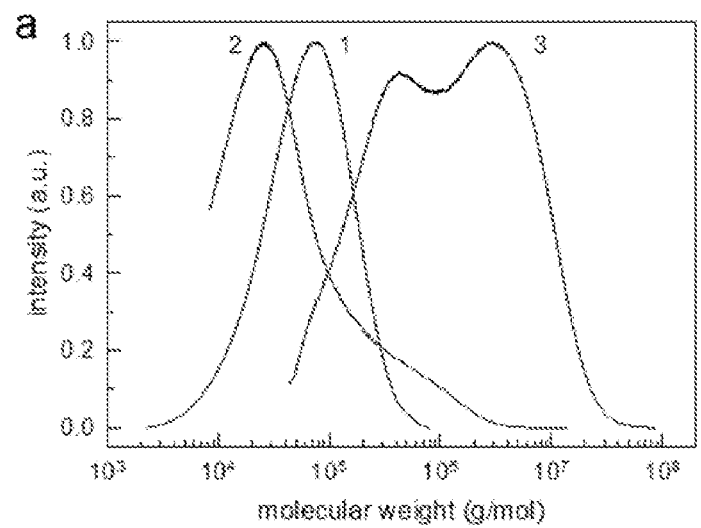
FIG. 8 shows the unmodified precursor polymer produced in Examples 8 and 9 via bulk polymerization in curves 1 and 2, and the molecular weight distribution of the modified polymer obtained thereby in curve 3.

Curves 1 and 2 of FIG. 8 show the unmodified precursor polymer produced in Examples 8 and 9 via bulk polymerization.

It is apparent that increasing the photoinitiator concentration by a factor of 100 shifted the distribution maximum into the low molecular weight region (FIG. 8, curve 2 compared to curve 1).

V. Modification of Polymers Obtained Via Photoinitiated Bulk Polymerization

Example 10

The polymer obtained in Example 9 was used as photoinitiator and building block simultaneously.

Prior to use the polymer was carefully purified by repeated reprecipitation from methanol so that no residual bis(2,4,6-trimethylbenzoyl)-phenylphosphineoxide (Irgacure® 819) was detectable by $^{31}$P-NMR.

20 g of water, 600 mg of SDS and 0.5 g of the purified polymer dissolved in 4 g of styrene were then irradiated at ambient temperature with the same light source used in Example 9 in the flow through reactor. The molecular weight distribution of the modified polymer obtained thereby is shown in curve 3 of FIG. 8.

Example 11

10 wt.-% of the polymer obtained in Example 9 were purified as described in Example 10 and dissolved in vinylacetate. The resulting solution was spread between a microscopy slide and a cover glass resulting in a uniform layer thickness of about 0.1 mm. The solution was then irradiated through the cover glass using the light source of Examples 8 and 9.

Example 12 (Comparative)

Instead of the purified polymer obtained in Example 9, the same amount of a thermally polymerized polystyrene was used. All other conditions were the same as in Example 11.

Example 13 (Comparative)

Instead of the purified polymer obtained in Example 9, the same amount of a thermally polymerized polystyrene was used. Additionally, 0.5 wt.-% of bis(2,4,6-trimethylbenzoyl)-phenylphosphineoxide (Irgacure® 819) based on n-butylacrylate was added. All other conditions were the same as in Example 11.

Results of Examples 11, 12, 13

Figure 9:
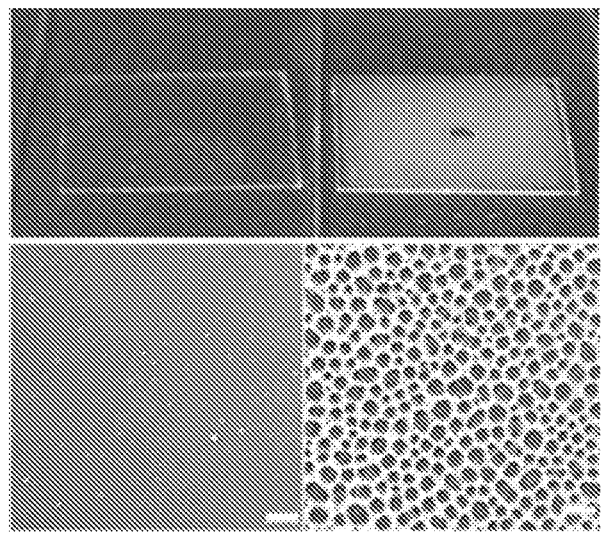
FIG. 9 shows the onset of polymerization in Example 11 via the occurrence of a slight turbidity.

The onset of the polymerization in Example 11 could be followed visually by the occurrence of a slight turbidity due to starting microphase separation of the block copolymer layer between the glasses (see FIG. 9, two pictures on the left side)

Contrary thereto, the solution employed in Example 12 stayed transparent, for example, a strongly turbid layer was formed (see FIG. 9, upper right side) indicating strong scattering effects at phase boundaries of the much larger regions where the homopolymers (polystyrene and polybutylacrylate) demix (see FIG. 9, lower right side).

The light microscopy images of FIG. 9 were taken using a Keyence VHX100 microscope under oblique illumination in transmission mode of the polymer film between the glass slides. The bars indicate 100 µm.

Both the polystyrene-polybutylacrylate block copolymer obtained in Example 11 and the polystyrene polybutylacrylate homopolymer mixture obtained in Example 13 glued both glass slides together, whereas the cover glass on the non-reactive solution of polystyrene in butylacrylate without initiator could be easily removed.

Example 14

10 wt.-% of the polymer obtained in Example 9 were purified as described in Example 10 and dissolved in vinylacetate in a glass beaker. The resulting solution was then irradiated through the transparent walls using the light source of Examples 8 and 9.

An elastic peace of a polystyrene-polyvinylacetate block copolymer was obtained having the shape of the beaker. The existence of a block copolymer was proven by adding glacial acetic acid which is a selective solvent for poly(vinyl acetate). A dispersion was formed indicating the known stabilization of the "insoluble" polystyrene blocks by the "soluble" polyvinylacetate blocks.

In contrast, adding glacial acetic acid to a mixture of polystyrene and polyvinylacetate homopolymers resulted in a transparent solution polyvinylacetate with free floating chunks of polystyrene.

Example 15

Figure 10:
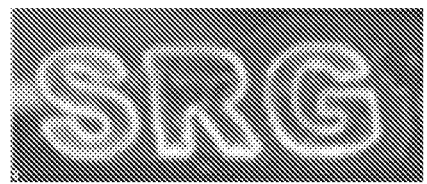
FIG. 10 shows the sequence of letters 'SRG' phototyped through a PTFE stencil using a 50 wt.-% solution of the polymer obtained in Example 9 purified as described in Example 10 in a styrene-butylacrylate mixture (3:2 g/g) with a small amount of a yellow dye.

The sequence of letters 'SRG' was phototyped through a PTFE stencil using a 50 wt.-% solution of the polymer obtained in Example 9 purified as described in Example 10 in a styrene-butylacrylate mixture (3:2 g/g) with a small amount of a yellow dye. The result is shown in FIG. 10

The present invention is not limited to embodiments described herein; reference should be had to the appended claims.

What is claimed is:

1. A process for the preparation of a modified polymer by a photo-initiated polymerization, the method comprising:
   A) preparing a polymerization medium comprising:
      at least one photoinitiator comprising at least one phosphorous oxide (P=O) group or at least one phosphorous sulfide (P=S) group, and
      at least one polymerizable monomer;
   B) polymerizing the at least one polymerizable monomer by irradiating the polymerization medium with electromagnetic radiation so as to induce a generation of radicals so as to obtain a polymer; and C) modifying the polymer obtained in B) by irradiating the polymer with electromagnetic radiation so as to induce a generation of radicals from the polymer in a presence of at least one modifying agent.

2. The process as recited in claim 1, wherein step B) is carried out as a bulk polymerization, a solution polymerization or as a heterophase polymerization in a heterophase medium.

3. The process as recited in claim 2, wherein the process further comprises forming modified lattices or modified polymer nanoparticles by a photo-initiated heterophase polymerization, the process further comprising:
A) preparing a heterophase medium comprising at least a dispersed phase and a continuous phase and at least:
at least one surfactant,
at least one photoinitiator, and
at least one polymerizable monomer;
B) polymerizing the at least one polymerizable monomer by irradiating the heterophase medium with electromagnetic radiation so as to induce a generation of radicals so as to obtain lattices comprising polymer nanoparticles; and
C) modifying the lattices or the polymer nanoparticles by irradiating the lattices or the polymer nanoparticles with electromagnetic radiation so as to induce a generation of radicals from the lattices or the polymer nanoparticles in a presence of the at least one modifying agent,
wherein, the at least one photoinitiator is selected from compounds comprising the at least one phosphorous oxide (P=O) group or the at least one phosphorous sulfide (P=S) group.

4. The process as recited in claim 2, wherein the heterophase medium is provided as an emulsion comprising an aqueous phase and an organic dispersed phase, the aqueous phase having a pH value in a range of 3 to 10 measured at standard conditions.

5. The process as recited in claim 1, wherein step A) is carried out continuously.

6. The process as recited in claim 1, wherein the at least one photoinitiator is selected from a compound of formula (I):

(I)

wherein
n is 1 or 2 or an integer >2,
m is 0, 1 or 2,
X is sulphur or oxygen,
$R^1$, if n=1 is $C_6$-$C_{14}$-aryl or $C_3$-$C_{14}$-heterocyclyl, or
is $C_1$-$C_{18}$-alkoxy, —N($R^4$)$_2$, $C_1$-$C_{18}$-alkyl, $C_2$-$C_{18}$-alkenyl or $C_2$-$C_{18}$-alkinyl,
which is either not, once, twice or more than twice interrupted by non-successive functional groups selected from the group consisting of:
—O—, —S—, —SO$_2$—, —SO—, —SO$_2$NR$^4$—, NR$^4$SO$_2$—, —NR$^4$—, —N$^+$(R$^4$)$_2$An$^-$-, —CO—, —O(CO)—, (CO)O—, —O(CO)O—, —NR$^4$(CO) NR$^4$—, NR$^4$(CO)—, —(CO)NR$^4$—, —NR$^4$(CO) O—, —O(CO)NR$^4$—, —Si(R$^5$)$_2$—, —OSi(R$^5$)$_2$—, —OSi(R$^5$)$_2$O—, and —Si(R$^5$)$_2$O—, and which is either not, once, twice or more than twice interrupted by bivalent residues selected from the group consisting of $C_3$-$C_{14}$-heterocyclo-diyl, $C_3$-$C_{14}$-heterocyclo-diylium$^+$An$^-$ and $C_6$-$C_{14}$-aryldiyl,
and which is not, additionally or alternatively either once, twice or more than twice substituted by substituents selected from the group consisting of:
halogen, cyano, azido, vicinal oxo (forming epoxides), vicinal NR$^5$ (forming aziridins), $C_6$-$C_{14}$-aryl, $C_1$-$C_8$-alkoxy, $C_1$-$C_8$-alkylthio, hydroxy, —SO$_3$M, —COOM, PO$_3$M$_2$, —PO(N(R$^5$)$_2$)$_2$, PO(OR$^5$)$_2$, —SO$_2$N(R$^4$)$_2$, —N(R$^4$)$_2$, —N$^+$(R$^4$)$_3$An$^-$, $C_3$-$C_{14}$-heterocyclylium$^+$An$^-$, —CO$_2$N(R$^4$)$_2$, —COR$^4$, —OCOR$^4$, —NR$^4$(CO)R$^5$, —(CO)OR$^4$, —NR$^4$(CO)N(R$^4$)$_2$, NR$^4$SO$_2$R$^4$, (OR$^5$)$_y$(R$^5$)$_{(3-y)}$, and —OSi(OR$^5$)$_y$(R$^5$)$_{(3-y)}$ with y=1, 2 or 3,
$R^1$, if n=2 is $C_6$-$C_{15}$-aryldiyl or $C_3$-$C_{14}$-heterocyclo-diyl, or
is $C_1$-$C_{18}$-alkanediyl, $C_2$-$C_{18}$-alkenediyl or $C_2$-$C_{18}$-alkinediyl,
which is either not, once, twice or more than twice interrupted by non-successive groups selected from the group consisting of:
—O—, —S—, —SO$_2$—, —SO—, —SO$_2$NR$^4$—, NR$^4$SO$_2$—, —NR$^4$—, —N$^+$(R$^4$)$_2$An$^-$-, —CO—, —O(CO)—, (CO)O—, —O(CO)O—, —NR$^4$(CO) NR$^4$—, NR$^4$(CO)—, —(CO)NR$^4$—, —NR$^4$(CO) O—, —O(CO)NR$^4$—, —Si(R$^5$)$_2$—, —OSi(R$^5$)$_2$—, —OSi(R$^5$)$_2$O—, and —Si(R$^5$)$_2$O—,
and which is either not, once, twice or more than twice interrupted by bivalent residues selected from the group consisting of $C_3$-$C_{14}$-heterocyclo-diyl, $C_3$-$C_{14}$— heterocyclo-diylium$^+$An$^-$ and $C_6$-$C_{14}$-aryldiyl,
and which is not, additionally or alternatively either once, twice or more than twice substituted by substituents selected from the group consisting of:
halogen, cyano, azido, vicinal oxo (forming epoxides), vicinal NR$^5$ (forming aziridins), $C_6$-$C_{14}$-aryl, $C_1$-$C_8$-alkoxy, $C_1$-$C_8$-alkylthio, hydroxy, —SO$_3$M, —COOM, PO$_3$M$_2$, —PO(N(R$^5$)$_2$)$_2$, PO(OR$^5$)$_2$, —SO$_2$N(R$^4$)$_2$, —N(R$^4$)$_2$, —N$^+$(R$^4$)$_3$An$^-$, $C_3$-$C_{14}$-heterocyclylium$^+$An$^-$, —CO$_2$N(R$^4$)$_2$, —COR$^4$, —OCOR$^4$, —NR$^4$(CO)R$^5$, —(CO)OR$^4$, —NR$^4$(CO)N(R$^4$)$_2$, NR$^4$SO$_2$R$^4$, —Si(OR$^5$)$_y$(R$^5$)$_{(3-y)}$, —OSi(OR$^5$)$_y$(R$^5$)$_{(3-y)}$ with y=1, 2 or 3, or
is bivalent bis($C_6$-$C_{15}$)-aryl, which is either not or once interrupted by groups selected from the group consisting of:
—O—, —S—, —SO$_2$—, —SO—, $C_4$-$C_{18}$-alkanediyl, and $C_2$-$C_{18}$-alkenediyl,
$R^1$, if n is an integer >2 is a polymeric backbone having n binding sites to residues of formula (I) given in brackets labeled with n,
$R^2$ is $C_6$-$C_{14}$-aryl or $C_3$-$C_{14}$-heterocyclyl, or
is $C_1$-$C_{18}$-alkyl, $C_2$-$C_{18}$-alkenyl or $C_2$-$C_{18}$-alkinyl,
which is either not, once, twice or more than twice interrupted by non-successive functional groups selected from the group consisting of:
—O—, —NR$^4$—, —N$^+$(R$^4$)$_2$An$^-$-, —CO—, —OCO—, —O(CO)O—, NR$^4$(CO)—, —NR$^4$(CO) O—, O(CO)NR$^4$—, and —NR$^4$(CO)NR$^4$—,
and which is either not, once, twice or more than twice interrupted by bivalent residues selected from the group consisting of heterocyclo-diyl, heterocyclo-diylium$^+$An$^-$, and $C_6$-$C_{14}$-aryldiyl, and which is not, additionally or alternatively either once, twice or more than twice substituted by substituents selected from the group consisting of:
halogen, cyano, hydroxy, protected hydroxyl, $C_6$-$C_{14}$-aryl; $C_3$-$C_{14}$-heterocyclyl, $C_1$-$C_8$-alkoxy, $C_1$-$C_8$-alkylthio, $C_2$-$C_8$-alkenyl, —COOM, —$SO_3$M, —$PO_3M_2$, —$SO_2N(R^4)_2$, —$NR^4SO_2R^5$, —$N(R^4)_2$—, —$N^+(R^4)_3An^-$, —$CO_2N(R^4)_2$, —$COR^4$—, —$OCOR^5$, —$O(CO)OR^5$, $NR^4(CO)R^4$, —$NR^4(CO)OR^4$, $O(CO)N(R^4)_2$, and —$NR^4(CO)N(R^4)_2$,
wherein, when m=2, the two substituents $R^2$ are different, identical, or jointly are $C_6$-$C_{15}$-aryldiyl, $C_3$-$C_{14}$-heterocyclo-diyl, $C_1$-$C_{18}$-alkanediyl, $C_2$-$C_{18}$-alkenediyl or $C_2$-$C_{18}$-alkinediyl,
$R^3$ independently denotes a substituent as defined for $R^1$ if n is 1,
wherein,
$R^4$ is independently selected from the group consisting of hydrogen, $C_1$-$C_8$-alkyl, $C_6$-$C_{14}$-aryl and $C_3$-$C_{14}$-heterocyclyl, or
$N(R^4)_2$ as a whole is an N-containing $C_3$-$C_{14}$-heterocycle, or
$N^+(R^4)_2An^-$ and $N^+(R^4)_3An^-$ as a whole are or contain an N-containing $C_3$-$C_{14}$-heterocyclyl substituent with a counteranion,
$R^5$ is independently selected from the group consisting of $C_1$-$C_8$-alkyl, $C_6$-$C_{14}$-aryl and $C_3$-$C_{14}$-heterocyclyl, or
$N(R^5)_2$ as a whole is an N-containing $C_3$-$C_{14}$-heterocycle, or
$N^+(R^5)_2An^-$ and $N^+(R^5)_3An^-$ as a whole are or contain an N-containing $C_3$-$C_{14}$-heterocyclyl substituent with a counteranion,
M is hydrogen, or
a 1/q equivalent of an q-valent metal ion, or
is a $C_3$-$C_{14}$-heterocyclylium cation, an ammonium ion, or
a primary organic ammonium, a secondary organic ammonium, a tertiary organic ammonium or a quarternary organic ammonium ion, or
a guanidinium ion, or
an organic guanidinium ion, and
An– is a 1/p equivalent of a p-valent anion.

7. The process as recited in claim 6, wherein the at least one photoinitiator is selected from compounds of formula (I) where:
X is oxygen,
n is 1,
m is 1 or 2,
$R^1$ and $R^3$ are, independently of each other, $C_6$-$C_{14}$-aryl, or are $C_1$-$C_{18}$-alkyl,
which is either not or once, twice or more than twice interrupted by non-successive functional groups selected from the group consisting of —O— and —$NR^4$—,
and which is not, additionally or alternatively, either not, once, twice or more than twice, substituted by substituents selected from the group consisting of chloro, fluoro, $C_1$-$C_8$-alkoxy, hydroxy, —$SO_3$M, —COOM, $PO_3M_2$, $SO_2N(R^4)_2$, —$N(R^4)_2$, —$N^+(R^4)_3An^-$, and —$CO_2N(R^4)_2$,
$R^2$ is $C_6$-$C_{14}$-aryl, wherein, when m=2, the substituents $R^2$ are different or identical,
wherein,
$R^4$ is independently selected from the group consisting of $C_1$-$C_8$-alkyl, $C_6$-$C_{14}$-aryl and $C_3$-$C_{14}$-heterocyclyl, or $N(R^4)_2$ as a whole is an N-containing $C_3$-$C_{14}$-heterocycle, or
$N^+(R^4)_2An^-$ and $N^+(R^4)_3An^-$ as a whole are or contain an N-containing $C_3$-$C_{14}$-heterocyc lyl substituent with a counteranion,
M is hydrogen, or a 1/q equivalent of a q-valent metal ion or is a $C_3$-$C_{14}$-heterocyclylium cation, an ammonium ion or a primary organic ammonium, a secondary organic ammonium, a tertiary organic ammonium or a quarternary organic ammonium ion, or a guanidinium ion or an organic guanidinium ion, lithium, sodium, potassium, one half equivalent of calcium, zinc or iron (II), or one third equivalent of aluminium (III) or a $C_3$-$C_{14}$-heterocyclylium cation or an ammonium ion or a primary organic ammonium, a secondary organic ammonium, a tertiary organic ammonium or a quarternary organic ammonium ion, and
An$^-$ is a 1/p equivalent of a p-valent anion, a $C_1$-$C_8$-alkyl carboxylate, $C_1$-$C_8$-alkyl sulfate, $C_6$-$C_{14}$-aryl sulfate, hexafluorophosphate, tetrafluoroborate, dihydrogenphosphate, one half equivalent of sulphate or hydrogenphosphate.

8. The process as recited in claim 1, wherein the at least one photoinitiator is selected from 2-(bis(2,4,6-trimethylbenzoyl)phosphoryl)acetic acid and its salts, (2-(2-(2-methoxyethoxy)ethoxy)ethyl)-(bis(2,4,6-trimethylbenzoyl)-phosphineoxide, 2,4,6-trimethylbenzoyl-diphenylphosphineoxide and bis(2,4,6-trimethylbenzoyl)-phenylphosphineoxide.

9. The process as recited in claim 1, wherein the at least one polymerizable monomer is selected of the group consisting of compounds of formula (IIa) and formula (IIb):

(IIa)

wherein,
$R^6$, $R^7$, $R^8$ and $R^9$ are, independently of one another, selected from the group consisting of:
hydrogen, $C_6$-$C_{14}$-aryl, $C_3$-$C_{14}$-heterocyclyl, $C_1$-$C_{18}$-alkoxy, $C_1$-$C_{18}$-alkyl, $C_2$-$C_{18}$-alkenyl and $C_2$-$C_{18}$-alkinyl,
which is either directly bound to a double bond in formula (IIa) or, in case of $C_6$-$C_{14}$-aryl, $C_3$-$C_{14}$-heterocyclyl, $C_1$-$C_{18}$-alkyl, $C_2$-$C_{18}$-alkenyl and $C_2$-$C_{18}$-alkinyl, alternatively, via a functional group selected from the group consisting of:
—CO—, —OCO—, —O(CO)O—, $NR^4$(CO)—, —$NR^4$(CO)O—, —O(CO)$NR^4$—, —(CO)$NR^4$—, —$NR^4$(CO)$NR^4$—, —Si$(R^5)_2$—, —OSi$(R^5)_2$—, —OSi$(R^5)_2$O—, —Si$(R^5)_2$O—,
and,
which is either not, once, twice or more than twice, interrupted by non-successive functional groups selected from the group consisting of:
—O—, —CO—, —OCO—, —O(CO)O—, $NR^4$(CO)—, —$NR^4$(CO)O—, —O(CO)$NR^4$—, —(CO)$NR^4$—, —$NR^4$(CO)$NR^4$—, —Si$(R^5)_2$—, —OSi$(R^5)_2$—, —OSi$(R^5)_2$O—, —Si$(R^5)_2$O—,
and which is additionally or alternatively, either not, once, twice or more than twice, interrupted by bivalent residues selected from the group consisting of $C_3$-$C_{14}$-heterocyclo-diyl and $C_6$-$C_{14}$-aryldiyl, and which is not, additionally or alternatively, either once, twice or more than twice substituted by substituents selected from the group consisting of:

halogen, cyano, vicinal oxo (forming epoxides), vicinal $NR^5$ (forming aziridins), $C_6$-$C_{14}$-aryl; $C_3$-$C_{14}$-heterocyclyl, $C_1$-$C_8$-alkylthio, hydroxy, —$SO_2N(R^4)_2$, $NR^4SO_2$—$R^5$, —$N(R^4)_2$, —$CO_2N(R^4)_2$, —$COR^4$, —$OCOR^4$, —$O(CO)OR^4$, $NR^4(CO)R^5$, —$NR^4(CO)OR^5$, $O(CO)N(R^4)_2$, —$NR^4(CO)N(R^4)_2$, —$OSi(OR^5)_{y-3}(R^5)_y$, —$Si(OR^5)_{y-3}(R^5)_y$ where y is 1, 2 or 3 or, wherein two residues of $R^6$, $R^7$, $R^8$ and $R^9$ together are $C_2$-$C_{18}$-alkanediyl or $C_3$-$C_{18}$-alkenediyl

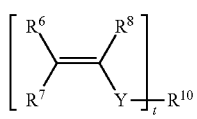

(IIb)

wherein, $R^6$, $R^7$ and $R^8$ are as set forth for formula (IIa),

Or, wherein two residues of $R^6$, $R^7$ and $R^8$ together are $C_2$-$C_{18}$-alkanediyl or $C_3$-$C_{18}$-alkenediyl, and wherein, t is an integer from 2 to 4, and Y is missing such that $R^{10}$ is directly bound to a double bond in formula (IIb) or is —CO— or —(CO)O—, and $R^{10}$ is a t-valent residue selected from the group consisting of $C_2$-$C_{18}$-alkanediyl (t=2), $C_3$-$C_{18}$-alkanetriyl (t=3), $C_4$-$C_{18}$-alkanetetrayl (t=4), $C_2$-$C_{18}$-alkenediyl (t=2), $C_3$-$C_{18}$-alkenetriyl (t=3), $C_4$-$C_{18}$-alkenetetrayl (t=4), $C_2$-$C_{18}$-alkinediyl (t=2), $C_6$-$C_{14}$-aryldiyl (t=2) and $C_3$-$C_{14}$-heterocyclodiyl (t=2).

10. The process as recited in claim 1, wherein the at least one polymerizable monomer is selected from:

methyl-, ethyl-, n-butyl-, glycidyl-, 2-ethylhexyl- and 2-hydroxyethyl acrylate; acrylamide, N-isopropylacrylamide, and acrylonitrile; methyl-, ethyl-, n-butyl-, glycidyl-, 2-ethylhexyl-, 2-hydroxyethyl and is obornyl methacrylate; methacrylamide, N-isopropylmethacrylamide and methacrylonitrile;

crotonic acid, maleic acid, fumaric acid, itaconic acid, cinnamic acid and linolenic acid or oleic acid and the respective $C_1$-$C_8$-alkyl esters thereof and $C_1$-$C_8$-alkyl diesters;

ethyl vinyl ether and isobutyl vinyl ether;

vinyl acetate;

vinylpyridine, styrene and styrene substituted by $C_1$-$C_8$-alkyl-, halogen, or sulfonic acid salts at an aromatic ring;

trimethoxyvinylsilane and triethoxyvinylsilan;

ethylene glycol diacrylate, 1,6-hexanediol diacrylate, propylene glycol diacrylate, dipropylene glycol diacrylate, tripropylene glycol diacrylate, neopentyl glycol diacrylate, hexamethylene glycol diacrylate and bis-phenol-A diacrylate, 4,4'-bis(2-acryloyloxyethoxy)diphenylpropane, trimethylolpropane tri-acrylate, pentaerythritol triacrylate, pentaerythritol tetraacrylate, vinyl acrylate, polyethyleneglycol-mono-acrylate, polyethylene-glycol-di-acrylate, ethylene glycol dimethacrylate, 1,6-hexanediol dimethacrylate, propylene glycol dimethacrylate, dipropylene glycol dimethacrylate, tripropylene glycol dimethacrylate, neopentyl glycol dimethacrylate, hexamethylene glycol dimethacrylate and bis-phenol-A dimethacrylate, 4,4'-bis(2-methacryloyloxyethoxy)diphenylpropane, trimethylolpropane tri-methacrylate, pentaerythritol trimethacrylate, pentaerythritol tetramethacrylate, vinyl methacrylate, polyethyleneglycol-mono-methacrylate, and polyethyleneglycol-di-methacrylate;

butadiene, isoprene, chloroprene, 2,4-dimethylbutadiene, cyclopentadiene, methylcyclopentadiene, cyclohexadiene, divinyl-benzene, 1-vinyl-cyclohexadiene, norbornadiene, 2-isopropenylnorbornene, 2-vinyl-norbornene, diisopropenylbenzene, divinyltoluene, divinylxylene and $C_1$ to $C_{20}$ alkyl-substituted derivatives of the aforementioned divinylaromatic multiolefins, divinyl succinate, diallyl phthalate, triallyl phosphate, triallyl isocyanurate, tris-(hydroxyethyl) isocyanurate triacrylate (Sartomer 368; from Cray Valley), tris(2-acryloyl-ethyl) isocyanurate, ethyleneglycoldivinylether, diethyleneglycoldivinylether, and triethyleneglycoldivinylether, and any mixture thereof.

11. The process as recited in claim 1, wherein, in at least one of step B) and step C), the irradiating of the poolymerization medium is effected so that a ratio of an irradiated surface of the polymerization medium to a volume of the polymerization medium is at least 600 m$^{-1}$.

12. The process as recited in claim 1, wherein, in at least one of step B) and step C), the irradiating is effected with electromagnetic radiation having a wavelength of below 500 nm.

13. The process as recited in claim 1, wherein, in at least one of step B) and step C), the irradiating is effected at an average intensity of at least 50 W per square meter of an irradiated surface of the polymerization medium.

14. The process as recited in claim 9 or 10, wherein the at least one modifying agent is selected from the at least one polymerizable monomer as recited in claim 9 or 10, the at least one polymerizable monomer being different from the at least one polymerizable monomer of steps A) and B).

15. The process as recited in claim 1, wherein the modified polymer is a blockcopolymer, a crosslinked polymer, a telechelic polymer or a functionalized blockcopolymer.

* * * * *